US012775227B2

(12) United States Patent
Narita

(10) Patent No.: US 12,775,227 B2
(45) Date of Patent: Oct. 27, 2026

(54) BELT CONVEYANCE DEVICE AND IMAGE FORMING APPARATUS

(71) Applicant: CANON KABUSHIKI KAISHA, Tokyo (JP)

(72) Inventor: Kazuyuki Narita, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 154 days.

(21) Appl. No.: 18/425,623

(22) Filed: Jan. 29, 2024

(65) Prior Publication Data

US 2024/0255868 A1 Aug. 1, 2024

(30) Foreign Application Priority Data

Jan. 30, 2023 (JP) ................................ 2023-012380
Oct. 30, 2023 (JP) ................................ 2023-186034

(51) Int. Cl.
*G03G 15/16* (2006.01)
*B65G 23/44* (2006.01)

(52) U.S. Cl.
CPC .......... *G03G 15/161* (2013.01); *B65G 23/44* (2013.01); *G03G 15/1615* (2013.01)

(58) Field of Classification Search
CPC ... G03G 15/161; G03G 15/1615; B65G 23/44
See application file for complete search history.

(56) References Cited

U.S. PATENT DOCUMENTS 9,195,177 B2 11/2015 Miyazawa et al.
9,575,437 B2 * 2/2017 Oba .................. G03G 15/1615
11,169,471 B2 11/2021 Aoshima et al.
2011/0206392 A1 * 8/2011 Hiratsuka .............. G03G 15/50 399/31
2016/0139553 A1 * 5/2016 Hozumi ............ G03G 15/6529 399/388

(Continued)

FOREIGN PATENT DOCUMENTS

JP 09-110229 A 4/1997
JP 2002-002999 A 1/2002

(Continued)

OTHER PUBLICATIONS

IPSearch History Jun. 3, 2026 UTC; InnovationQ+; https://iq.ip.com/discover (Year: 2026).*

*Primary Examiner* — Gene O Crawford
*Assistant Examiner* — Abby A Jorgensen
(74) *Attorney, Agent, or Firm* — Venable LLP

(57) ABSTRACT

A belt conveyance device includes an endless belt, first and second stretching rollers to stretch the belt, a steering roller tiltably supported and to stretch the belt, a steering mechanism to tilt the steering roller in a direction where a change of a position of the belt in a widthwise direction is cancelled, and an adjusting mechanism. The adjusting mechanism is capable of adjusting an inclination angle in a rotational axis direction of the second stretching roller relative to the rotational axis direction of the first stretching roller. At least during a transferring operation when toner is transferred onto the belt, the second stretching roller is capable of being adjusted by the adjusting mechanism so that the inclination angle becomes a predetermined angle and then is held so that the inclination angle is not changed.

24 Claims, 20 Drawing Sheets

(56) References Cited

U.S. PATENT DOCUMENTS

| | | | | |
|---|---|---|---|---|
| 2017/0060043 | A1* | 3/2017 | Kitago | G03G 15/1615 |
| 2018/0120739 | A1* | 5/2018 | Hozumi | G03G 15/168 |
| 2018/0217529 | A1* | 8/2018 | Fumoto | B65H 5/021 |
| 2020/0333731 | A1* | 10/2020 | Murakami | G03G 15/1615 |
| 2021/0263449 | A1* | 8/2021 | Miyake | B65H 5/021 |
| 2021/0382417 | A1* | 12/2021 | Katano | G03G 15/2017 |
| 2022/0004123 | A1* | 1/2022 | Miyake | G03G 15/161 |
| 2022/0011696 | A1* | 1/2022 | Nakajima | G03G 15/1615 |
| 2022/0019161 | A1* | 1/2022 | Hori | G03G 15/0136 |
| 2022/0043371 | A1* | 2/2022 | Nakajima | G03G 15/1615 |
| 2022/0057738 | A1* | 2/2022 | Aoshima | B65H 5/021 |

FOREIGN PATENT DOCUMENTS

| | | | |
|---|---|---|---|
| JP | 2015-001732 | A | 1/2015 |
| JP | 2020-012989 | A | 1/2020 |

* cited by examiner (a)

(b)

(a)

(b)

(a)

(b)

BELT CONVEYANCE DEVICE AND IMAGE FORMING APPARATUS

FIELD OF THE INVENTION AND RELATED ART

The present invention relates to a belt conveyance device which is used in an image forming apparatus such as a copy machine, a printer, a facsimile device or a multifunction machine provided with several of these functions using an electrophotographic method or an electrostatic recording method, and the image forming apparatus provided with the belt conveyance device.

Conventionally, for example, in the image forming apparatus using the electrophotographic method or the electrostatic recording method, the belt conveyance device provided with an endless belt (herein also referred to simply as a "belt") stretched over a plurality of stretching rollers is used. The belt is used as a conveyance member which carries and conveys a toner image or carries and conveys a recording material onto which the toner image is to be formed. The conveyance member which carries and conveys the toner image includes an electrophotographic photosensitive member of a belt shape (photosensitive member belt), an intermediary transfer member (intermediary transfer belt) which carries and conveys the toner image transferred from the photosensitive member to transfer the toner image onto the recording material, etc. In addition, the conveyance member which carries and conveys the recording material onto which the toner image is to be formed includes a recording material carrying member (conveyance belt) which carries and conveys the recording material onto which the toner image is transferred from the photosensitive member, etc. Hereinafter, an example of the image forming apparatus of the electrophotographic method provided with the intermediary transfer belt will be mainly described.

The belt, which is stretched over a plurality of the stretching rollers to be driven and rotated (conveyed), generally, has a problem that a "shift" ("meandering") may occur. The shift of the belt is a phenomenon in which a conveyance position of the belt in a widthwise direction of the belt (a direction substantially perpendicular to a conveyance direction) is shifted to either side of the end portions when the belt is driven and rotated (conveyed). The shift of the belt occurs due to accuracy of an outer diameter of each stretching roller, accuracy of relative alignment between each stretching roller, etc.

As a countermeasure against the shift of the belt, there is a method of moving the intermediary transfer belt in a direction opposite to the misalignment of the position of the intermediary transfer belt in the widthwise direction by tilting at least one of the stretching rollers (steering roller) relative to the other stretching rollers (Japanese Patent Application Laid-Open No. 2002-2999).

However, in the configuration where the steering roller is tilted relative to the other stretching rollers, parallelism between the steering roller and the other stretching rollers with respect to the conveyance direction of the intermediary transfer belt is disestablished. Then, difference in tension with respect to the widthwise direction of the intermediary transfer belt occurs on a stretched surface of the intermediary transfer belt near a portion wound on the steering roller.

In contrast to the difference in the tension with respect to the widthwise direction of the intermediary transfer belt, the tension in the circumferential length of the intermediary transfer belt is substantially the same in the widthwise direction of the intermediary transfer belt. Therefore, in the widthwise direction of the intermediary transfer belt, the intermediary transfer belt is taut on a side where the tension is high, and the intermediary transfer belt is slack on a side where the tension is low. Then, for example, a "waving" occurs, which is a phenomenon where the intermediary transfer belt left over flaps at a position that corresponds to an antinode between portions correspond to nodes supported by stretching rollers. In a case where the waving occurs near a surface of an upstream side in the conveyance direction of the intermediary transfer belt of a secondary transfer portion (front surface of a secondary transfer portion) where the toner image on the intermediary transfer belt is transferred to the recording material such as a paper, it may cause an image disturbance. In addition, in a case where the waving occurs near a surface which includes a detecting position (detecting surface) of a sensor which detects a position and density of the toner image on the intermediary transfer belt, it may cause detection failure of the sensor.

Therefore, an object of the present invention is to suppress the waving of the belt caused by the difference in the tension with respect to the widthwise direction of the belt which occurs due to the tilt of the steering roller.

SUMMARY OF THE INVENTION

The object described above is achieved by a belt conveyance device and an image forming apparatus according to the present invention. In summary, the present invention is a belt conveyance device comprising: an endless belt onto which a toner image is transferred; a first stretching roller configured to stretch the belt; a second stretching roller configured to stretch the belt; a steering roller tiltably supported with respect to a rotational axis direction of the first stretching roller and configured to stretch the belt, a steering mechanism, by action generated between the belt and the steering roller due to a change of a position of the belt in a widthwise direction, configured to tilt the steering roller in a direction where the change of the position of the belt in the widthwise direction is cancelled; and an adjusting mechanism capable of adjusting an inclination angle in a rotational axis direction of the second stretching roller relative to the rotational axis direction of the first stretching roller, wherein at least during a transferring operation when the toner is transferred onto the belt, the second stretching roller is capable of being adjusted by the adjusting mechanism so that the inclination angle becomes a predetermined angle and then is held so that the inclination angle is not changed.

According to another aspect of the present invention, there is provided a belt conveyance device comprising: an endless belt onto which a toner image is transferred; a first stretching roller configured to stretch the belt; a second stretching roller configured to stretch the belt; a steering roller tiltably supported with respect to a rotational axis direction of the first stretching roller and configured to steer the belt, a steering mechanism, by action generated between the belt and the steering roller due to a change of a position of the belt in a widthwise direction, configured to tilt the steering roller in a direction where the change of the position of the belt in the widthwise direction is cancelled; and an adjusting mechanism capable of adjusting an inclination angle in a rotational axis direction of the second stretching roller relative to the rotational axis direction of the first stretching roller, wherein the adjusting mechanism includes an adjusting member attached to a movable bearing member rotatably supporting the second stretching roller and an abutting portion contacted by the adjusting member, and wherein the adjusting member includes a plurality of contacting portions contactable to the abutting portion, distances in a radial direction of the second stretching roller from the plurality of contacting portions to a rotational axis of the second stretching roller being different, and wherein any one of the plurality of contacting portion is adjusted so as to contact the abutting portion by a position of the adjusting member with respect to a rotational direction about the rotational axis of the second stretching roller being changed and then by the adjusting member being attached to the bearing member.

Further features of the present invention will become apparent from the following description of exemplary Embodiments with reference to the attached drawings.

DESCRIPTION OF THE EMBODIMENTS

Hereinafter, a belt conveyance device and an image forming apparatus according to the present invention will be described in more detail in accordance with the drawings.

Embodiment 1

1. Overall Configuration and Operation of an Image Forming Apparatus

Figure 1:
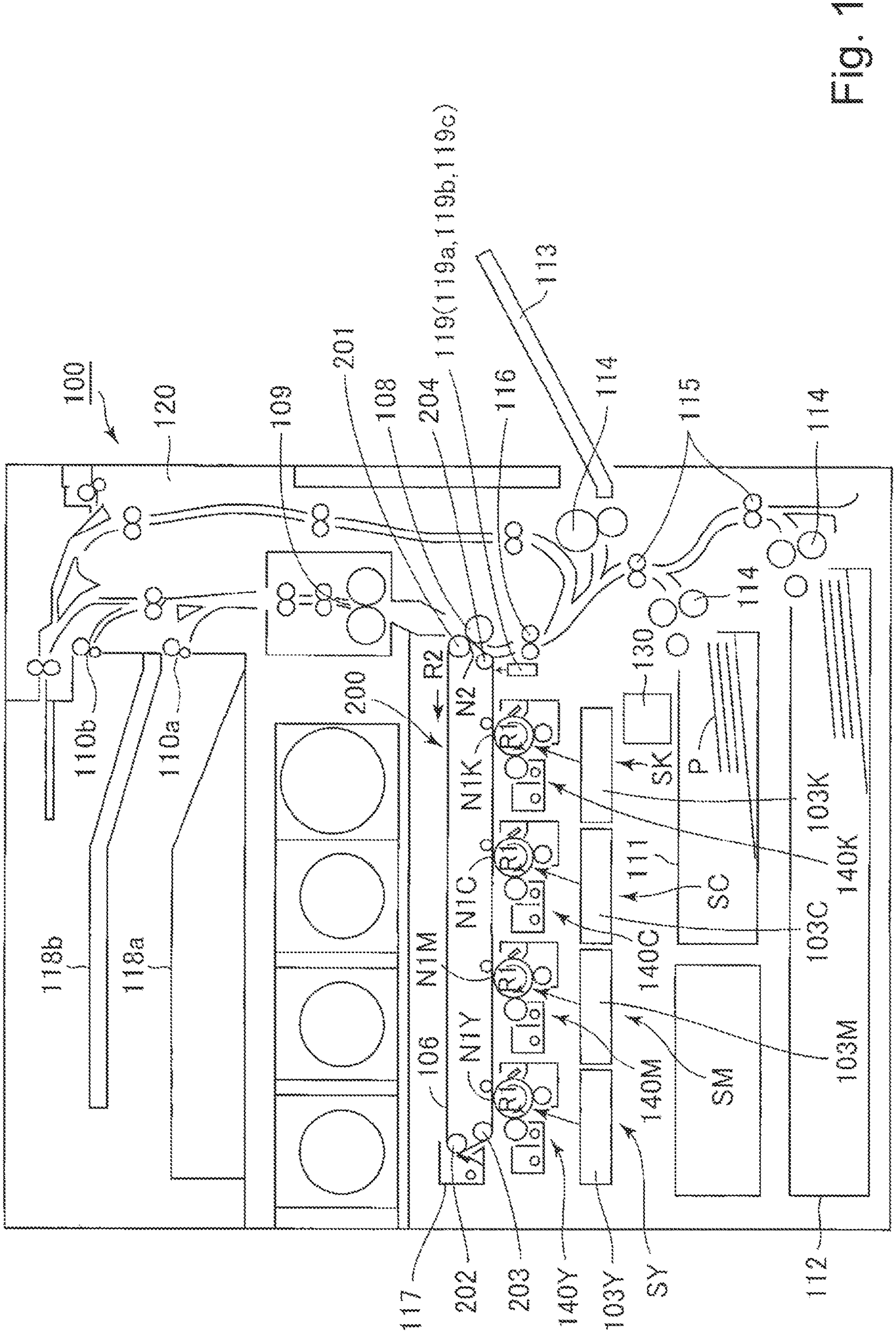
FIG. 1 is a schematic cross-sectional view of an image forming apparatus.

FIG. 1 is a schematic cross-sectional view of an image forming apparatus 100 of the present Embodiment. The image forming apparatus 100 of the present Embodiment is a color digital printer of tandem-type employing an intermediary transfer method, which is capable of forming a full color image on a recording material P of sheet shape such as a paper using an electrophotographic method.

Figure 2:
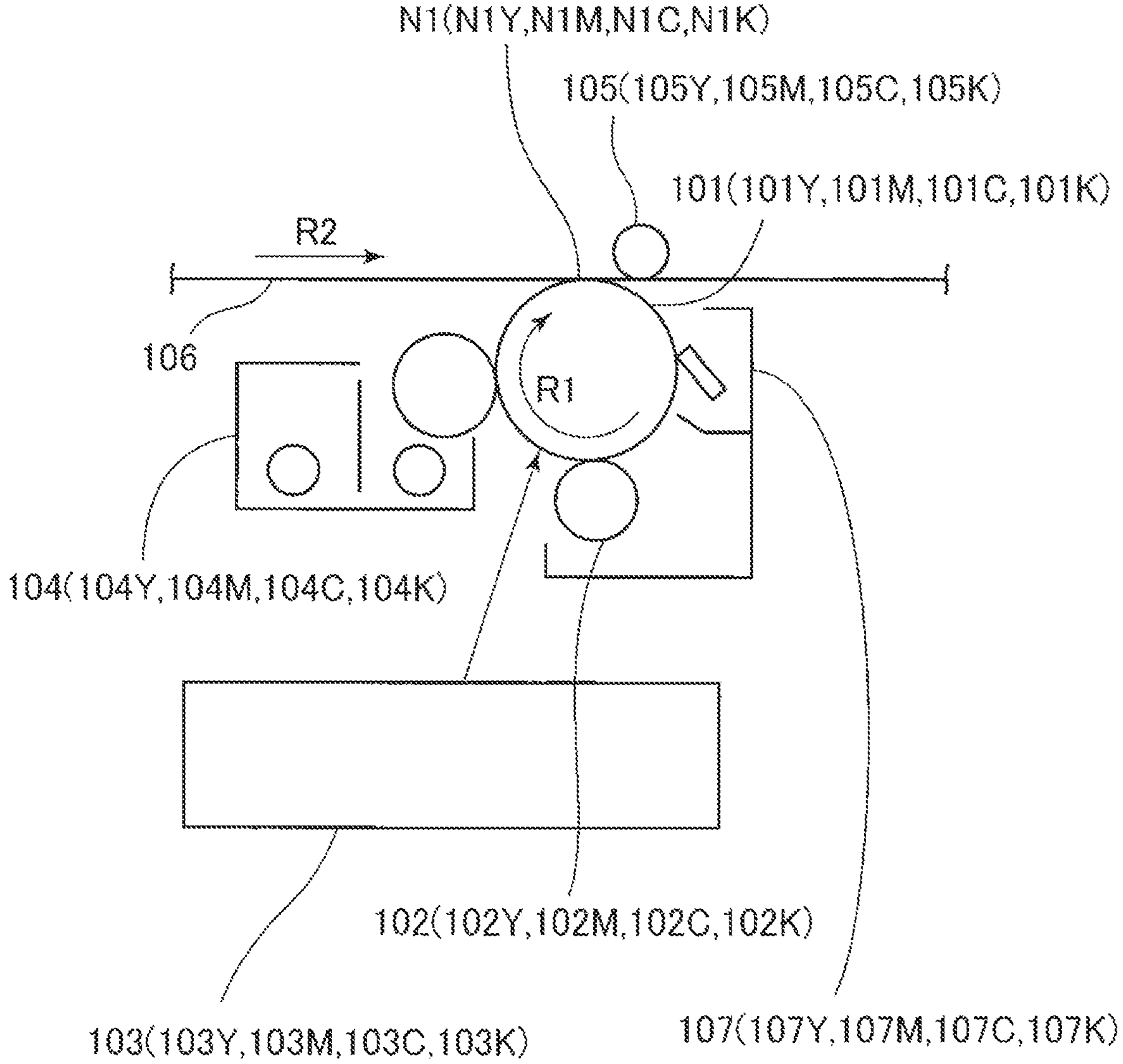
FIG. 2 is a schematic cross-sectional view of an image forming portion.

The image forming apparatus 100 is provided with four image forming portions SY, SM, SC and SK, which form yellow (Y), magenta (M), cyan (C) and black (K) images, respectively, as a plurality of image forming portions (stations). Elements having the same or corresponding functions or configurations which are provided for each color may be described collectively by omitting ends Y, M, C and K of the reference numerals each of which indicates that the element is provided for one of the colors. FIG. 2 is a schematic cross-sectional view illustrating an enlarged image forming portion S. In the present Embodiment, the image forming portion S (SY, SM, SC and SK) is provided with a photosensitive drum 101 (101Y, 101M, 101C and 101K), a charging roller 102 (102Y, 102M, 102C and 102K), an exposure device 103 (103Y, 103M, 103C and 103K), a developing device 104 (104Y, 104M, 104C and 104K), a primary transfer roller 105 (105Y, 105M, 105C and 105K), a drum cleaner 107 (107Y, 107M, 107C and 107K), etc. Incidentally, the exposure device 103 may be configured as a single unit which performs exposure to the photosensitive drums 101Y, 101M, 101C and 101K of the four image forming portions SY, SM, SC and SK.

Here, with respect to the image forming apparatus 100 and elements thereof, a near side of the paper in FIG. 1 is defined as a "front side" and a back side of the paper in FIG. 1 is defined as a "rear side". A straight-line direction connecting the front side and the rear side is substantially parallel to a rotational axis direction of the photosensitive drum 101. In addition, with respect to the image forming apparatus 100 and the elements thereof, up and down refers to above and below in the gravity direction (vertical direction), however, it does not mean directly above or directly below only, but includes above or below the horizontal with respect to a reference position or an element. In addition, a position in the image forming apparatus 100 or a positional relationship of elements in the image forming apparatus 100 refers to a positional relationship when the image forming apparatus 100 is placed in a normally used posture.

The photosensitive drum 101, which is a drum-shaped photosensitive member (electrophotographic photosensitive member) as an image bearing member, is driven and rotated in a direction of an arrow R1 in FIG. 1 and FIG. 2 by driving force transmitted from a drum driving motor (not shown) as a driving source, which constitutes a driving means. A surface of the rotating photosensitive drum 101 is uniformly charged to predetermined potential of predetermined polarity (negative polarity in the present Embodiment) by the charging roller 102, which is a roller-shaped charging member as a charging means. During the charging process, predetermined charging voltage (charging bias), which includes a direct current component of the same polarity as the charging polarity of the photosensitive drum 101 (negative polarity in the present Embodiment), is applied to the charging roller 102. The charged surface of the photosensitive drum 101 is scanned and exposed by the exposure device (laser scanner) 103 as an exposure means in accordance with an image signal, and an electrostatic latent image (electrostatic image) corresponding to the image signal is formed on the photosensitive drum 101. The exposure device 103 receives an image signal corresponding to each image forming portion S, and irradiates the surface of the photosensitive drum 101 with a laser beam in accordance with the image signal to neutralize the electric charge on the photosensitive drum 101 and form the electrostatic latent image. The electrostatic latent image formed on the photosensitive drum 101 is developed (visualized) by toner as a developer being supplied by the developing device 104 as a developing means, and a toner image (developer image) is formed on the photosensitive drum 101. In the present Embodiment, the toner charged to the same polarity as the charging polarity of the photosensitive drum 101 (negative polarity in the present Embodiment) is adhered to an exposed portion (image portion) on the photosensitive drum 101 where an absolute value of the potential has decreased due to the exposure after the uniform charging (reverse development method). In the present Embodiment, a normal charging polarity of the toner, which is a main charging polarity of the toner during the development, is negative polarity. During the development, predetermined developing voltage (developing bias), which includes a direct current component of the same polarity as the charging polarity of the photosensitive drum 101 (negative polarity in the present Embodiment), is applied to a developer sleeve as a developer carrying member (developing member), which is provided to the developing device 104.

An intermediary transfer belt 106, which is constituted by an endless belt as an intermediary transfer member, is disposed opposite to the four photosensitive drums 101Y, 101M, 101C and 101K. The intermediary transfer belt 106 is stretched over a plurality of stretching rollers and is stretched at predetermined tensile force. A driving roller 201, which is one of the plurality of stretching rollers is driven and rotated by driving force transmitted from a belt driving motor (not shown) as a driving source, which constitutes the driving means. The intermediary transfer belt 106 rotates (circulates) in a direction of an arrow R2 in FIG. 1 and FIG. 2 by driving force transmitted from the driving roller 201. On an inner circumferential surface side of the intermediary transfer belt 106, primary transfer rollers 105Y, 105M, 105C and 105K, which are roller-shaped primary transfer members as primary transfer means, are disposed corresponding to the four photosensitive drums 101Y, 101M, 101C and 101K, respectively. The primary transfer roller 105 urges (presses) the intermediary transfer belt 106 toward the photosensitive drum 101 to form a primary transfer portion (primary transfer nip) N1 (N1Y, N1M, N1C and N1K), which is a contact portion between the intermediary transfer belt 106 and the photosensitive drum 101. The toner image formed on the photosensitive drum 101 is electrostatically transferred (primary transfer) onto the rotating intermediary transfer belt 106 by an action of the primary transfer roller 105 in the primary transfer portion N1. During the primary transfer, predetermined primary transfer voltage (primary transfer bias), which is direct current voltage having reverse polarity to the normal charging polarity of the toner, is applied to the primary transfer roller 105. For example, during full-color image formation, the toner images of each color of YMCK formed on each photosensitive drum 101 is sequentially transferred so as to be superimposed on the intermediary transfer belt 106 in each primary transfer portion N1. As a result, a multi-layered toner image for a full-color image is formed on the intermediary transfer belt 106.

Here, a direction substantially perpendicular to a conveyance direction (running direction, rotational direction, movement direction of a surface) of the intermediary transfer belt 106 is also referred to as a "widthwise direction" of the intermediary transfer belt 106. The widthwise direction of the intermediary transfer belt 106 is substantially parallel to the rotational axis direction of the photosensitive drum 101 and a rotational axis direction of the stretching roller (in particular, the driving roller 201 in the present Embodiment) of the intermediary transfer belt 106. In other words, the widthwise direction of the intermediary transfer belt 106 is substantially parallel to the straight-line direction connecting the front side and the rear side of the image forming apparatus 100.

Meanwhile, a recording material (transfer material, recording medium, sheet) P such as a paper is fed from either of a recording material cassette 111, a recording material cassette 112 or a manual feed tray 113 by a feeding roller 114, etc., as a feeding member. The recording material P is conveyed by conveyance rollers 115, etc., as conveyance members to a registration roller 116 as a synchronizing conveyance member. A leading end of the recording material P abuts on the stopped registration roller 116 and forms a loop. Thereafter, the registration roller 116 starts rotating in synchronization with the toner image on the intermediary transfer belt 106, and the recording material P is conveyed by the registration roller 116 to a secondary transfer portion N2, which will be described below.

On an outer circumferential surface side of the intermediary transfer belt 106, a secondary transfer roller (secondary transfer outer roller) 108, which is a roller-shaped secondary transfer member as a secondary transfer means, is disposed in a position opposite to the driving roller (secondary transfer inner roller) 201. The secondary transfer roller 108 is urged (pressed) toward the driving roller 201 via the intermediary transfer belt 106 to form a secondary transfer portion (secondary transfer nip) N2, which is a contact portion between the intermediary transfer belt 106 and the secondary transfer roller 108. The toner image on the intermediary transfer belt 106 is electrostatically transferred (secondarily transferred) onto the recording material P nipped and conveyed by the intermediary transfer belt 106 and the secondary transfer roller 108 in the secondary transfer portion N2 by an action of the secondary transfer roller 108. During the secondary transfer, predetermined secondary transfer voltage having direct current voltage of reverse polarity to the normal charging polarity of the toner (secondary transfer bias) is applied to the secondary transfer roller 108.

The recording material P onto which the toner image has been transferred is conveyed to a fixing device 109 as a fixing means. The fixing device 109 applies heat and pressure to the recording material P which carries the unfixed toner image to fix (melt and fixedly adhere) the toner image on the recording material P. Then the recording material P onto which the toner image has been fixed is discharged from either of a discharge portion 110*a* or a discharge portion 110*b* to either of a discharge tray 118*a* or a discharge tray 118*b* which is provided outside an apparatus main assembly 120 of the imaging forming apparatus 100 (outside the device).

In addition, the toner remaining on the photosensitive drum 101 after the primary transfer (primary transfer remaining toner) is removed from the photosensitive drum 101 and collected by a drum cleaner 107 as a photosensitive drum cleaning means. In addition, a belt cleaner 117 as an intermediary transfer member cleaning means is provided on the outer circumferential surface side of the intermediary transfer belt 106. The belt cleaner 117 is disposed downstream of the secondary transfer portion N2 and upstream of the primary transfer portion N1 (the most upstream primary transfer portion N1Y) with respect to the conveyance direction of the intermediary transfer belt 106. In particular, in the present Embodiment, the belt cleaner 117 is disposed opposite to a steering roller 202, which is one of the plurality of the stretching rollers. Adhesive materials such as the toner remaining on the intermediary transfer belt 106 after the secondary transfer process (secondary transfer remaining toner) are removed from the intermediary transfer belt 106 and collected by the belt cleaner 117.

The image forming apparatus 100 is provided with a control portion 130 to control each portion of the image forming apparatus 100. The control portion 130 controls each portion of the image forming apparatus 100 to execute an image forming operation based on an image signal sent from an external device (not shown) such as an image reading apparatus or a personal computer connected to the image forming apparatus 100.

Figure 12:
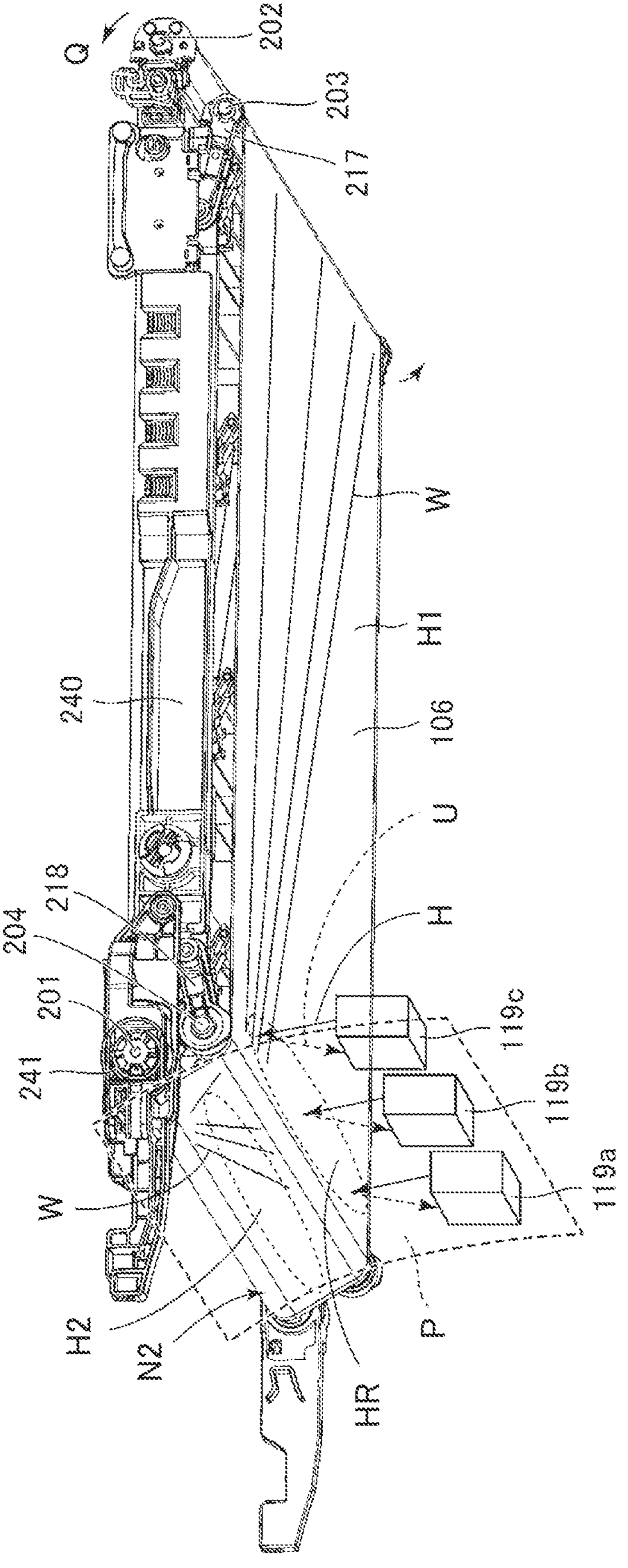
FIG. 12 is a schematic perspective view of the intermediary transfer unit illustrating a stretched state of the intermediary transfer belt.

In addition, a sensor unit 119 is disposed on the outer circumferential surface side of the intermediary transfer belt 106 to detect the toner image on the intermediary transfer belt 106. The sensor unit 119 is disposed so as to detect the toner image on the intermediary transfer belt 106 at a detecting position downstream of the primary transfer portion N1 (the most downstream primary transfer portion N1K) and upstream of the secondary transfer portion N2 in the conveyance direction of the intermediary transfer belt 106. In the present Embodiment, the sensor unit 119 is provided with a registration patch detecting sensor and a density patch detecting sensor. The registration patch detecting sensor detects a position of a registration patch (color misalignment correction patch). The registration patch is a test toner image to control an exposure timing in the image forming portion S for each color so that toner images of multiple colors in a full-color image, etc., are properly superimposed (color misalignment correction control). The density patch detecting sensor detects density of a density patch (density correction patch). The density patch is a test toner image to control an applied voltage condition and the image signal in the image forming portion S for each color so that density of the toner image for each color is a desired density (density correction control). The control portion 130 controls to form the registration patches and the density patches on the intermediary transfer belt 106 at predetermined timings. The control portion 130 then executes the color misalignment correction control and the density correction control based on detection signals which are output when the registration patch detecting sensor detects the registration patch and the density patch detecting sensor detects the density patch, respectively. In the present Embodiment, the sensor unit 119 is provided with a front side sensor portion 119*a* in the front side, a central sensor portion 119*b* in a center portion and a rear side sensor portion 119*c* in the rear side of the intermediary transfer belt 106 with respect to the widthwise direction, respectively (FIG. 12). These three sensor portions 119*a*, 119*b* and 119*c* may each have a function of the registration patch detecting sensor and the density patch detecting sensor, or each may have a function of either of the registration patch detecting sensor or the density patch detecting sensor. As an example, in the present Embodiment, the front side sensor portion 119*a* and the rear side sensor portion 119*c* have the function of the registration patch detecting sensor, and the central sensor portion 119*b* has the function of the density patch detecting sensor.

Here, in the present Embodiment, each image forming portion SY, SM, SC and SK constitutes a toner image forming means which forms the toner image on the intermediary transfer belt 106.

In addition, in the present Embodiment, in each image forming portion S, the photosensitive drum 101 and the charging roller 102, the developing device 104 and the drum cleaner 107 as process means, which act on the photosensitive drum 101, constitute a process cartridge 140. The process cartridge 140 is configured to be integrally attachable to and detachable from the apparatus main assembly 120. Incidentally, for example, the developing device 104 and the photosensitive drum 101 may be configured to be substantially independently attachable to and detachable from the apparatus main assembly 120.

In addition, the intermediary transfer belt 106, the plurality of stretching rollers which stretch the intermediary transfer belt 106, each primary transfer roller 105, the belt cleaner 117, etc., constitute an intermediary transfer unit 200 as the belt conveyance device in the present Embodiment. The intermediary transfer unit 200 is configured to be integrally attachable to and detachable from the apparatus main assembly 120. The intermediary transfer unit 200 will be described in more detail below. Incidentally, the apparatus main assembly 120 of the image forming apparatus 100 is a portion excluding each process cartridge 140 and the intermediary transfer unit 200 from the image forming apparatus 100.

2. Outlined Configuration of the Intermediary Transfer Unit

Figure 3:
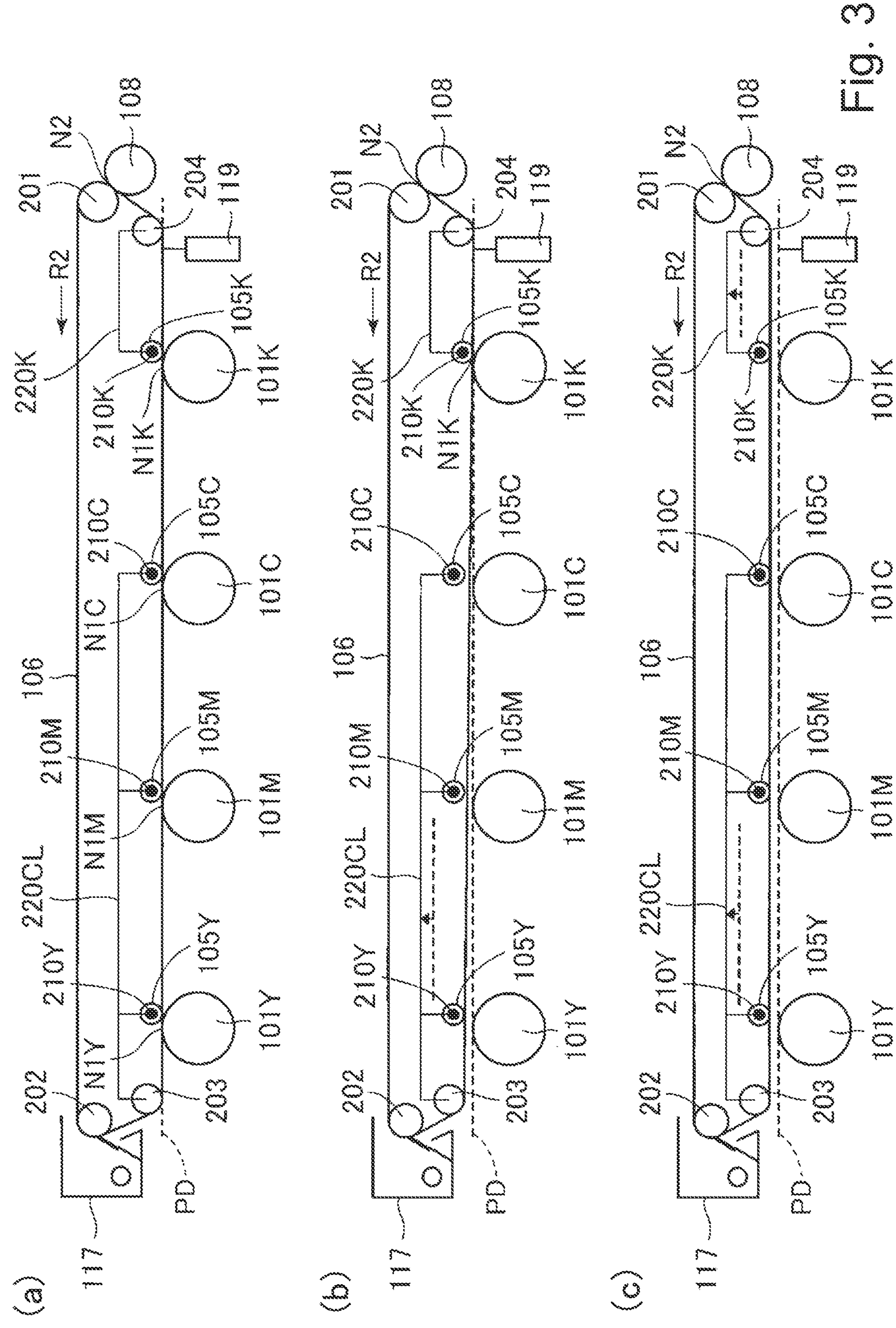
FIG. 3, part (a), part (b) and part (c), is a schematic cross-sectional view of an intermediary transfer unit in each stretching mode of an intermediary transfer belt.

Next, with reference to FIG. 1, part (a) of FIG. 3 and FIG. 12, an outlined configuration of the intermediary transfer unit 200 as the belt conveyance device in the present Embodiment will be described. Part (a) of FIG. 3 is a schematic cross-sectional view of the intermediary transfer unit 200 of the present Embodiment (the photosensitive drum 101, the secondary transfer roller 108 and the sensor unit 119 are also illustrated and the same applies to part (b) and part (c) of FIG. 3). In addition, FIG. 12 is a perspective view of the intermediary transfer unit 200 of the present Embodiment (an illustration of the belt cleaner 117 is omitted, and the recording material P and the sensor unit 119 are also illustrated). Incidentally, in FIG. 12, a state of a waving, which will be described in detail, is schematically illustrated. In addition, in FIG. 12, the rear side is illustrated at the near side of the paper. Here, in the present Embodiment, supporting configurations of each kind of rollers, etc., in the intermediary transfer unit 200 are substantially the same on the front side and the rear side (substantially symmetrical with respect to a center of the intermediary transfer belt 106 in the widthwise direction), unless otherwise mentioned.

The intermediary transfer unit 200 includes a frame 240 (FIG. 12) as a supporting member. Each element of the intermediary transfer unit 200 is configured to be held directly, or indirectly via other members, by the frame 240 and be integrally attachable to and detachable from the apparatus main assembly 120.

In addition, the intermediary transfer unit 200 is provided with the intermediary transfer belt 106 as the intermediary transfer member. In the present Embodiment, the intermediary transfer belt 106 is constituted by an endless belt (film) made of polyimide. Incidentally, material of the intermediary transfer belt 106 is not limited to polyimide, but resin such as PVDF (polyvinylidene fluoride), polyamide, PET (polyethylene terephthalate), polycarbonate, etc., may be used.

In addition, the intermediary transfer unit 200 is provided with four stretching rollers: the driving roller 201, the steering roller 202, a pre-primary transfer roller 203, and a pre-secondary transfer roller 204, as the plurality of the stretching rollers which stretch the intermediary transfer belt 106.

The driving roller 201, in the present Embodiment, serves as an opposite roller to the secondary transfer roller 108 (inner secondary transfer roller) and also serves as the driving roller which is driven and rotated by the belt driving motor (not shown) as the driving source to transmit the driving force to the intermediary transfer belt 106.

The driving roller 201 rotates (circulates, conveys) the intermediary transfer belt 106 in a rotational direction of an arrow R2 in part (a) of FIG. 3. A surface of the driving roller 201 is formed of a rubber layer with a high coefficient of friction to convey the intermediary transfer belt 106 without slipping. The driving roller 201 is rotatably supported by a bearing portion 241 (FIG. 12) which is provided in the frame 240 at both end portions in the rotational axis direction thereof.

The steering roller 202 is disposed adjacent to and on a downstream side of the driving roller 201 with respect to the conveyance direction of the intermediary transfer belt 106. In other words, the steering roller 202 is positioned downstream of the driving roller 201 and upstream of the pre-primary transfer roller 203 with respect to the conveyance direction of the intermediary transfer belt 106. The steering roller 202 is rotated by the rotation of the intermediary transfer belt 106. The steering roller 202 serves to correct the shift of the intermediary transfer belt 106. In addition, in the present Embodiment, the steering roller 202 also serves as a tension roller which applies tension to the intermediary transfer belt 106. In addition, in the present Embodiment, the steering roller 202 also serves as an opposite roller to the belt cleaner 117, which collects the adherent materials such as the secondary transfer remaining toner and the test toner images for various adjustment sequences. The steering roller 202 is rotatably supported by a steering roller bearing member 211 (FIG. 5) which is attached to a swinging plate 212 (FIG. 5) so as to be capable of a sliding move, which will be described below, at both end portions in a rotational axis direction thereof. A supporting configuration and a steering mechanism of the steering roller 202 will be described in more detail below.

The pre-primary transfer roller 203 is disposed adjacent to and on a downstream side of the steering roller 202 with respect to the conveyance direction of the intermediary transfer belt 106. In other words, the pre-primary transfer roller 203 is positioned downstream of the steering roller 202 and upstream of the pre-secondary transfer roller 204 with respect to the conveyance direction of the intermediary transfer belt 106. The pre-primary transfer roller 203 is rotated by the rotation of the intermediary transfer belt 106. A position of a lower surface (outer circumferential surface) of the intermediary transfer belt 106, which is directly below the pre-primary transfer roller 203 in part (a) of FIG. 3, is substantially identical with a position of a surface (common tangent plane) PD, which is directly above center lines of each photosensitive drum 101, in the vertical direction. By this, the pre-primary transfer roller 203 stabilizes a position of a primary transfer surface H1 (FIG. 12), which is a surface of the intermediary transfer belt 106 to which the toner images from each photosensitive drum 101 is primarily transferred. The pre-primary transfer roller 203 is rotatably supported by a pre-primary transfer roller bearing member 217 (FIG. 12), which is movably attached to the frame 240 at both end portions in the rotational axis direction thereof.

In addition, the pre-secondary transfer roller 204 is disposed adjacent to and on a downstream side of the pre-primary transfer roller 203 with respect to the conveyance direction of the intermediary transfer belt 106. In other words, the pre-secondary transfer roller 204 is positioned downstream of the pre-primary transfer roller 203 and upstream of the driving roller 201 with respect to the conveyance direction of the intermediary transfer belt 106. The pre-secondary transfer roller 204 is rotated by the rotation of the intermediary transfer belt 106. A position of the lower surface (outer circumferential surface) of the intermediary transfer belt 106 directly below the pre-secondary transfer roller 204 in part (a) of FIG. 3 is substantially identical with the position of the surface (common tangent plane) PD directly above the center lines of each photosensitive drum 101, in the vertical direction. By this, the pre-secondary transfer roller 204 stabilizes the position of the primary transfer surface H1 (FIG. 12).

In addition, in the present Embodiment, a nominal shape of the pre-secondary transfer roller 204 is a crown shape (normal crown shape), of which an outer diameter of a center portion is larger than outer diameters of both end portions with respect to a rotational axis direction thereof. By this, it becomes easier to stretch a secondary transfer surface H2 (FIG. 12), which is a surface on an upstream side of the secondary transfer portion N2 with respect to the conveyance direction of the intermediary transfer belt 106 (stretched surface formed by the pre-secondary transfer roller 204 and the driving roller 201), and to stabilize the secondary transfer surface H2. The pre-secondary transfer roller 204 is rotatably supported by a pre-secondary transfer roller bearing member 218 (FIG. 12), which is movably attached to the frame 240 at both end portions in a rotational axis direction thereof.

Incidentally, in the present Embodiment, the four photosensitive drums 101 are arranged in a substantially straight line along the conveyance direction of the intermediary transfer belt 106. In addition, in the present Embodiment, an arrangement direction of the four photosensitive drums 101 is a substantially horizontal direction.

More precisely, in the present Embodiment, the four photosensitive drums 101 are arranged in the substantially straight line so that the common tangent plane (tangential line) PD to all of the photosensitive drums 101 on a side of the intermediary transfer unit 200 is approximately horizontal.

In addition, the intermediary transfer unit 200 is provided with the four primary transfer rollers 105Y, 105M, 105C and 105K. The four primary transfer rollers 105Y, 105M, 105C and 105K are each positioned, via the intermediary transfer belt 106, opposite to the photosensitive drums 101Y, 101M, 101C and 101K, respectively. Each primary transfer roller 105 is disposed between the pre-primary transfer roller 203 and the pre-secondary transfer roller 204 with respect to the conveyance direction of the intermediary transfer belt 106. Each primary transfer roller 105 is rotatably supported by a primary transfer roller bearing member 210 (part (a) of FIG. 3), which is movably attached to the frame 240, at both end portions with respect to a rotational axis direction thereof, respectively. The primary transfer roller bearing member 210 is urged toward the photosensitive drum 101 by a primary transfer spring (not shown), which is an urging member as an urging means. In the present Embodiment, the primary transfer spring is constituted by a compression coil spring, which is an elastic member, and is disposed between the frame 240 and the primary transfer roller bearing member 210. Each primary transfer roller 105 nips the intermediary transfer belt 106 with the corresponding photosensitive drum 101 to form the primary transfer portion N1.

Furthermore, the intermediary transfer unit 200 is provided with the belt cleaner 117. The belt cleaner 117 is attached to the swinging plate 212 (FIG. 5), which will be described below, via a steering roller shaft 202*a* (FIG. 5), which protrudes from both end portions in the rotational axis direction of the steering roller 202.

3. Separating Mechanism

Next, with reference to part (a), part (b) and part (c) of FIG. 3, a switching of stretching modes of the intermediary transfer belt 106 and a separating mechanism to switch the stretching modes of the intermediary transfer belt 106 in the present Embodiment will be described.

First, the switching of the stretching modes of the intermediary transfer belt 106 according to image forming modes of the image forming apparatus 100 in the present Embodiment will be described. The image forming apparatus 100 in the present Embodiment is configured to perform an image forming operation in a "color mode" and in a "monochrome mode". The color mode is an image formation mode which can form a full-color image on the recording material P by performing an image formation with all four image forming portions SY, SM, SC and SK. The monochrome mode is an image formation mode which can form a black monochrome image as a monochrome image on the recording material P with only the image forming portion SK for K color out of the four image forming portions SY, SM, SC and SK. For example, it is possible to switch between the color mode and the monochrome mode, for example: to the color mode for an image formation in full color when printing an advertisement with many photographs, and to the monochrome mode for an image formation in monochrome when printing an image data which is constituted only by text. This is to suppress wear and tear of the photosensitive drum 101 and the developing device 104 of the image forming portions SY, SM and SC for each color of YMC by not operating the image forming portions SY, SM and SC for each color of YMC in the monochrome mode. However, simply stopping rotations of rotating members of the photosensitive drum 101 and the developing device 104 of the image forming portions SY, SM and SC in the monochrome mode may cause the stopped photosensitive drum 101 and the rotating intermediary transfer belt 106 to rub against each other, and may cause damage to each other. Therefore, in the present Embodiment, the image forming apparatus 100 is provided with a first separating mechanism 220CL. And the image forming apparatus 100 is configured so that the first separating mechanism 220CL operates as follows according to the image forming mode.

Part (a) of FIG. 3 is a schematic cross-sectional view of the intermediary transfer unit 200 illustrating an "all contacting state", which is a stretching mode of the intermediary transfer belt 106 in the color mode. In addition, part (b) of FIG. 3 is a schematic cross-sectional view of the intermediary transfer unit 200 illustrating a "black contacting state", which is a stretching mode of the intermediary transfer belt 106 in the monochrome mode. The first separating mechanism 220CL can move the primary transfer rollers 105Y, 105M and 105C for each color of YMC and the pre-primary transfer roller 203 to a "first position" ("near position", "contacting position") and a "second position" ("far position", "retracted position"), respectively. The first position is a close position to the common tangent plane PD of each photosensitive drum 101. In addition, the second position is a farther position from the common tangent plane PD of each photosensitive drum 101 (retracted inside of the intermediary transfer belt 106) than the first position. The primary transfer rollers 105Y, 105M and 105C for each color of YMC and the pre-primary transfer roller 203 are moved above to the second position from the first position by an operation of the first separating mechanism 220CL. As a result, the intermediary transfer belt 106 is separated from the photosensitive drums 101Y, 101M and 101C for each color of YMC, and the stretching mode of the intermediary transfer belt 106 is switched from the all contacting state shown in part (a) of FIG. 3 to the black contacting state shown in part (b) of FIG. 3. In addition, the primary transfer rollers 105Y, 105M and 105C for each color of YMC and the pre-primary transfer roller 203 are moved downward from the second position to the first position by the operation of the first separating mechanism 220CL. As a result, contrary to the above, the intermediary transfer belt 106 is in contact with the photosensitive drums 101Y, 101M and 101C for each color of YMC, and the stretching mode of the intermediary transfer belt 106 is switched from the black contacting state shown in part (b) of FIG. 3 to the all contacting state shown in part (a) of FIG. 3.

The switching between the all contacting state and the black contacting state can be done arbitrarily by a user (operator) selecting the color mode or the monochrome mode arbitrarily (arbitrary selection). In addition, the switching can be done automatically by the control portion 130 automatically determining and selecting between the color mode and the monochrome mode based on characteristics of image data sent by the user, for example, from the external device to the image forming apparatus 100 (automatic change). In the automatic change, for example, a switching method, such that in a case of image data corresponding to several sheets of the recording material, which is basically a text document but a few pictures are used in the middle of the document, the text document portion is printed in the monochrome mode and the portion including pictures is printed in the color mode, is performed. This is called a monochrome/color mixed printing.

Next, the switching of the stretching mode of the intermediary transfer belt 106 for an attachment and a detachment of the intermediary transfer unit 200 in the present Embodiment will be described. In the present Embodiment, the intermediary transfer unit 200 (in particular, the intermediary transfer belt 106) is a consumable part. Therefore, the image forming apparatus 100 in the present Embodiment, for example, is periodically subjected to a replacement of the intermediary transfer unit 200. When the intermediary transfer unit 200 is replaced, an open/close unit, which is provided on a right side surface of the apparatus main assembly 120, when the image forming apparatus 100 is viewed from the front side, is opened. The open/close unit is configured to include the secondary transfer roller 108 and a part of elements constituting a conveyance passage of the recording material P to the secondary transfer portion N2. Therefore, by opening the open/close unit, it becomes possible for the intermediary transfer unit 200 to be pulled out to a right direction from the apparatus main assembly 120. Upon detaching the intermediary transfer unit 200 from the apparatus main assembly 120, if the photosensitive drum 101 and the intermediary transfer belt 106 are in contact with each other, the photosensitive drum 101 and the intermediary transfer belt 106 rub against each other as an operation of pulling out the intermediary transfer unit 200 of the apparatus main assembly 120. By this, the photosensitive drum 101 and the intermediary transfer belt 106 may be damaged, respectively. An attachment of the intermediary transfer unit 200 to the apparatus main assembly 120 is performed, contrary to the above, by inserting the intermediary transfer unit 200 in a left direction in a state where the open/close unit is opened. A risk of the damage to photosensitive drum 101 and intermediary transfer belt 106 described above is the same as when the intermediary transfer unit 200 is attached to the apparatus main assembly 120. Therefore, in the present Embodiment, the image forming apparatus 100 is provided with a second separating mechanism 220K. And the image forming apparatus 100 is configured so that when the intermediary transfer unit 200 is detached from the apparatus main assembly 120, the second separating mechanism 220K operates as follows together with the first separating mechanism 220CL described above. Incidentally, when the intermediary transfer unit 200 is attached to the apparatus main assembly 120, the stretching mode of the intermediary transfer belt 106 is in the same state as when the intermediary transfer unit 200 is detached from the apparatus main assembly 120.

Part (c) of FIG. 3 is a schematic cross-sectional view of the intermediary transfer unit 200 illustrating an "all separated state", which is a stretching mode of the intermediary transfer belt 106 when the intermediary transfer unit 200 is attached to or detached from the apparatus main assembly 120. The second separating mechanism 220K can move the primary transfer roller 105K for K color and the pre-secondary transfer roller 204 to a "first position" ("near position", "contacting position") and a "second position" ("far position", "retracted position"), respectively. The first position is a close position to the common tangent plane PD of each photosensitive drum 101. In addition, the second position is a farther position from the common tangent plane PD of each photosensitive drum 101 (retracted inside of the intermediary transfer belt 106) than the first position. The primary transfer roller 105K for K color and the pre-secondary transfer roller 204 are moved upward from the first position to the second position by an operation of the second separating mechanism 220K. As a result, the intermediary transfer belt 106 is separated from the photosensitive drum 101K for K color, and the stretching mode of the intermediary transfer belt 106 is switched from the all contacting state shown in part (a) of FIG. 3 (or the black contacting state shown in part (b) of FIG. 3) to the all separated state shown in part (c) of FIG. 3. By the intermediary transfer belt 106 being separated from all photosensitive drums 101 in this manner, the rubbing between the photosensitive drums 101 and the intermediary transfer belt 106 due to a pulling out operation of the intermediary transfer unit 200 from the apparatus main assembly 120 (or an attachment operation to the apparatus main assembly 120) is suppressed. Incidentally, a switching from the all separated state shown in part (c) of FIG. 3 to the all contacting state shown in part (a) of FIG. 3 can be performed by moving corresponding rollers below by the first separating mechanism 220CL and the second separating mechanism 220K. In addition, a switching from the all separated state shown in FIG. 3(*c*) to the black contacting state shown in FIG. 3(*b*) can be performed by moving corresponding rollers below by the second separating mechanism 220K.

The switching from the all contacting state or the black contacting state to the all separated state is configured to be performed, for example, in interrelation with an operation by the user to open the above open/close unit. Alternatively, it may be configured to switch to the all separated state whenever an operation of the image forming apparatus 100 is stopped.

Here, for the first separating mechanism 220CL and the second separating mechanism 220K, any available configuration, such as a known configuration, for example, may be used. For example, the first separating mechanism 220CL is constituted by a first moving member which is moved by driving force transmitted from a separating motor (not shown) as a driving source which constitutes the driving means being provided to the apparatus main assembly 120. The first moving member is configured to move the primary transfer roller bearing members 210Y, 210M and 210C for each color of YMC and the pre-primary transfer roller bearing member 217 so as to move the corresponding rollers between the first position and the second position described above. In addition, for example, the second separating mechanism 220K is constituted by a second moving member which is moved by driving force transmitted from a separating motor (not shown) as a driving source which constitutes the driving means being provided to the apparatus main assembly 120. The second moving member is configured to move the primary transfer roller bearing member 210K for K color and the pre-secondary transfer roller bearing member 218 so as to move the corresponding rollers between the first position and the second position described above. Incidentally, a configuration for moving the pre-secondary transfer roller 204 in the second separating mechanism 220K will be described in further detail below.

4. Steering Mechanism

Next, a steering mechanism which corrects a misalignment of a conveyance position of the intermediary transfer belt 106 in the widthwise direction of the intermediary transfer belt 106 due to the shift of the intermediary transfer belt 106 and to set the conveyance position of the intermediary transfer belt 106 back toward substantially a center in the rotational axis direction of the stretching rollers will be described.

Figure 4:
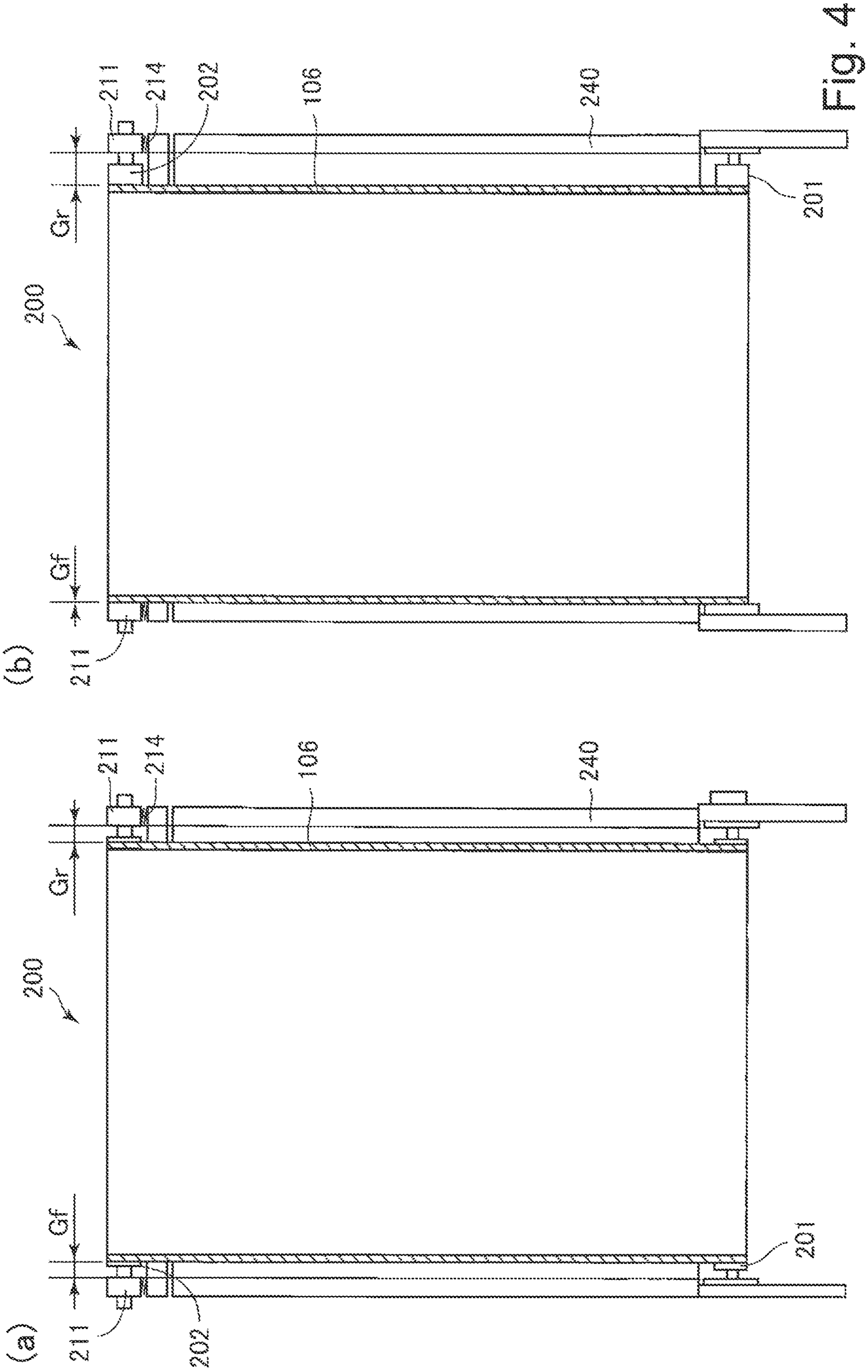
FIG. 4, part (a) and part (b), is a schematic top view of the intermediary transfer unit to illustrate a shift of a belt.

First, the shift of the intermediary transfer belt 106 will be described with reference to FIG. 4. FIG. 4, part (a) and part (b), is a schematic top view of the intermediary transfer unit 200 without the steering mechanism being provided. The intermediary transfer unit 200 shown in FIG. 4 is provided with the same configuration as the intermediary transfer unit 200 of the present Embodiment, except that no steering mechanism is provided. Incidentally, the intermediary transfer unit 200 shown in FIG. 4 will also be described with the same reference numeral for elements that are provided with the same or corresponding functions or configurations as those in the present Embodiment.

When the intermediary transfer belt 106, which is stretched over a plurality of the stretching rollers, is driven and rotated (conveyed), the conveyance position (running position) in the widthwise direction may slide (shift) to either side of the end portion. The phenomenon is the shift of the intermediary transfer belt 106. The shift of the intermediary transfer belt 106 occurs due to causes such as misalignment of parallelism of the stretching rollers and difference in outer diameters with respect to the rotational axis direction of the stretching rollers. And as a result of combined effects of these causes, the conveyance position of the intermediary transfer belt 106 in the widthwise direction is gradually shifted toward either side of the end portion.

Part (a) of FIG. 4 illustrates a state where no shift of the intermediary transfer belt 106 is occurring, and part (b) of FIG. 4 illustrates a state where the end portion of the intermediary transfer belt 106 in the widthwise direction is in contact with the bearing member 211 of the stretching roller since the shift of the intermediary transfer belt 106 occurs. As shown in part (a) of FIG. 4, in the state where no shift is occurring, when a distance between members such as the frame 240 or the bearing member 211 of the stretching roller and the end portion of the intermediary transfer belt 106 in the widthwise direction is defined as Gf on the front side, and as Gr on the rear side, both have enough space. However, as shown in part (b) of FIG. 4, for example, in a case where the conveyance position of the intermediary transfer belt 106 is shifted to the front side (left side in part (b) of FIG. 4), the Gf is decreased and the end portion of the intermediary transfer belt 106 may be in contact with the members such as the frame 240 and the bearing member 211 of the stretching roller. For example, in a case where shifting force is large relative to material properties of the intermediary transfer belt 106, the intermediary transfer belt 106 may shift further from this state. The end portion of the intermediary transfer belt 106 in the widthwise direction may then be deformed, and the intermediary transfer belt 106 may eventually buckle from the end portion and break.

4-2. Steering Mechanism in the Present Embodiment

Therefore, in the present Embodiment, the steering mechanism is provided in the intermediary transfer unit 200 to correct the misalignment of the conveyance position of the intermediary transfer belt 106 in the widthwise direction of the intermediary transfer belt 106 due to the shift of the intermediary transfer belt 106. In particular, in the present Embodiment, the intermediary transfer unit 200 is provided with a self alignment mechanism which automatically aligns the intermediary transfer belt 106 by automatically tilting the steering roller 202 as the steering mechanism. In the self alignment mechanism, the steering roller 202 is automatically tilted to maintain balance of frictional force between the intermediary transfer belt 106 and rubbing portions provided at each end portion in the rotational axis direction of the steering roller 202. By this, it becomes possible to perform the self alignment of the intermediary transfer belt 106 automatically.

Figure 5:
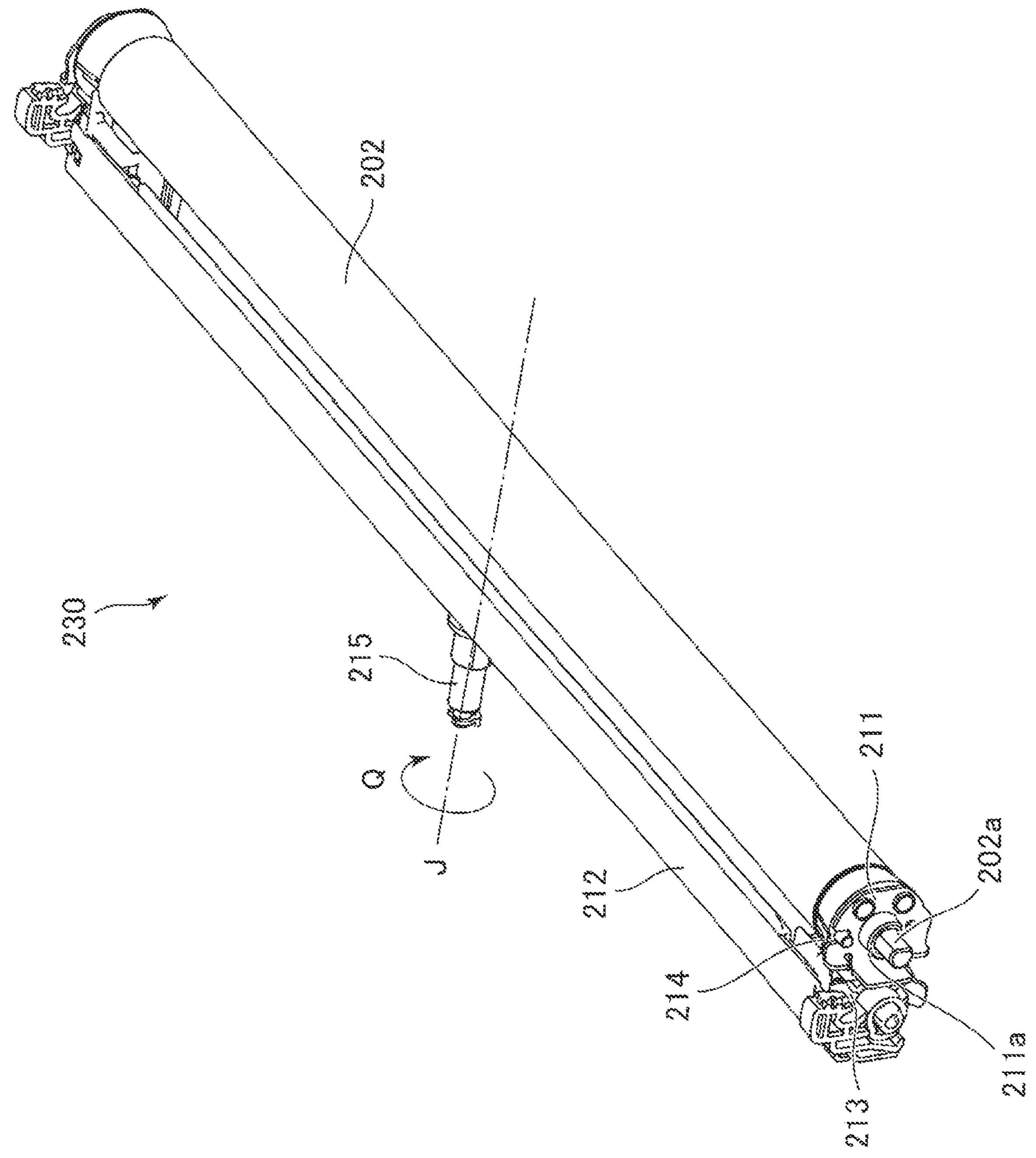
FIG. 5 is a schematic perspective view of a steering mechanism.
Figure 6:
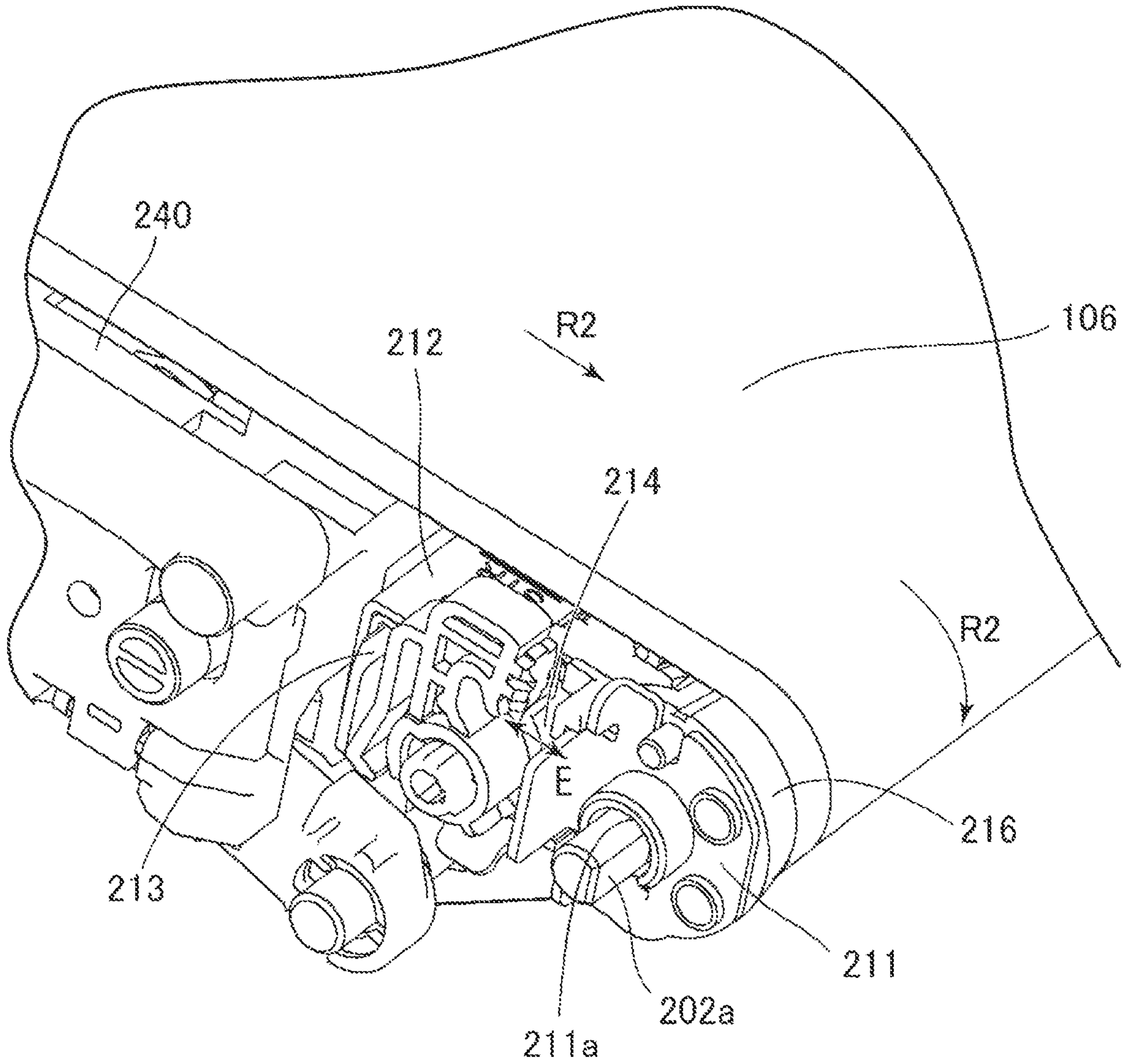
FIG. 6 is a schematic perspective view of a vicinity of one end portion of a steering roller.

Next, the steering mechanism (self alignment mechanism) in the present Embodiment will be described. FIG. 5 is a schematic perspective view of the steering mechanism (self alignment mechanism) 230 in the present Embodiment. In addition, FIG. 6 is a schematic perspective view illustrating a vicinity of one end portion of the steering roller 202 in the intermediary transfer unit 200 to illustrate the steering mechanism 230 in the present Embodiment. In FIG. 5 and FIG. 6, the rear side is illustrated in the near side of the paper.

The steering roller 202 is provided with the steering roller shaft **202*a*, which is a rotation shaft member protruding from both end portions in the rotational axis direction. The steering roller bearing members 211 are disposed at positions corresponding to both end portions in the rotational axis direction of the steering roller 202, respectively. Each steering roller shaft 202*a* is rotatably supported by the steering roller bearing member 211 by being fitted into supporting holes 211*a*, each of which is provided in the steering roller bearing member 211**.

A pair of the steering roller bearing members 211 is attached on the swinging plate 212 as a supporting member so as to support both end portions in the rotational axis direction of the steering roller 202, which is a driven roller, respectively. In other words, each steering roller bearing member 211 is supported by slide guides 213 as guiding portions, each of which is attached to both end portions in a longitudinal direction of the swinging plate 212 (the rotation axial direction of the steering roller 202). Each steering roller bearing member 211 is supported so as to be capable of a sliding move by the slide guide 213 in a direction from the inner circumferential surface side to the outer circumferential surface side of the intermediary transfer belt 106 and vice versa. Between the steering roller bearing member 211 and the slide guide 213, a tension spring 214 which is constituted by a compressed coil spring, which is an urging member as an urging means, is provided in a compressed state.

The swinging plate 212, while supporting the steering roller 202, constitutes a swinging member (tilting member), which is swingable (tiltable) so as to be capable of changing the alignment of the steering roller 202 relative to the driving roller 201. In other words, the swinging plate 212 is attached to the frame 240 so as to be swingable (tiltable) together with the steering roller 202. And the swinging plate 212 is capable of changing an angle of the rotational axis direction of the steering roller 202 relative to the rotational axis direction of the driving roller 201, which is supported by the frame 240.

In addition, the tension spring 214 constitutes an urging member which applies tension force to the steering roller 202, which acts to the inner circumferential surface of the intermediary transfer belt 106. An urging direction of the steering roller 202 applied by the tension spring 214 is from the rotational axis (rotational center) of the steering roller 202 to a direction toward an area where the intermediary transfer belt 106 is winding around the steering roller 202. In the present Embodiment, a pair of the tension springs (spring members) 214 are provided at both end portions in the longitudinal direction of the swinging plate 212 so as to apply the tension force to the pair of steering roller bearing members 211, respectively.

In the slide guides 213, a fitting groove (not shown) which guides the steering roller bearing member 211 to move only in a direction along the pressing direction of the tension spring 214 (direction of an arrow E in FIG. 6). In other words, each slide guide 213 constitutes a guiding portion which guides each steering roller bearing member 211 along the urging direction of each tension spring 214. By this, it becomes possible to transmit the urging force of the tension spring 214 to the corresponding steering roller bearing member 211 effectively.

In a state where the intermediary transfer belt 106 is stretched around the plurality of stretching rollers 201 through 204, the steering roller bearing member 211 moves in a direction in which the steering roller bearing member 211 compresses the tension spring 214 along the direction of the arrow E in FIG. 6 from a state of a natural length. As a result, the steering roller 202 applies predetermined tensile force to the intermediary transfer belt 106. Thus, in the present Embodiment, the steering roller 202 also serves as a tension roller.

As shown in FIG. 5, a pivoting shaft member 215, which is protruding in a direction toward the frame 240 (to the left), is fixed in a center portion in the longitudinal direction of the swinging plate 212. And the slide guides 213 are fixed to both end portions in the longitudinal direction of the swinging plate 212, respectively.

The pivoting shaft member 215 is fitted into a fitting portion (not shown) provided in the frame 240, thereby supporting the swinging plate 212 which supports the steering roller 202 rotatably (tiltably, swingably). By this, as shown in FIG. 5, the swinging plate 212 is supported on the frame 240 so that it is rotatable (tiltable, swingable) in a direction of an arrow Q in FIG. 5 and vice versa about a steering axis line J which passes through the pivoting shaft member 215 of the center portion in the longitudinal direction of the swinging plate 212. Thus, in the present Embodiment, the steering mechanism (self alignment mechanism) 230 is configured as a steering roller supporting unit as a pivoting unit.

As shown in FIG. 6, in the pair of the steering roller bearing members 211, sliding ring portions 216, which are rubbing surfaces as rubbing portions which rub the inner circumferential surface of the intermediary transfer belt 106, respectively, are provided. The sliding ring portion 216 is configured to apply force to the steering roller 202 to tilt the steering roller 202 for the self alignment of the intermediary transfer belt 106. In the present Embodiment, the sliding ring portion 216 is formed in a tapered shape in which a distance between the steering roller 202 and an outer circumferential surface of the sliding ring portion 216 gradually increases as it goes from a center side to an outer side of the rotational axis direction of the steering roller 202. This enhances a function of the self alignment of the intermediary transfer belt 106 by the steering mechanism 230. In the present Embodiment, an outer diameter of the steering roller 202 is set to φ16 (16 mm), for example. In addition, in the present Embodiment, the sliding ring portion 216 includes a curved surface portion of a curved shape having the same outer diameter as that of the steering roller 202, φ16 (16 mm), at an adjacent portion (bonding portion) to the steering roller 202. And in the present Embodiment, the sliding ring portion 216 has the curved surface portion with a shape of which the outer diameter gradually increases as it goes from the center side to the outer side in the rotational axis direction of the steering roller 202 at a rate of a taper angle ψ=10° from the curved surface portion of the adjacent portion (bonding portion) to the steering roller 202.

In the present Embodiment, a dimension of the intermediary transfer belt 106 in the widthwise direction is set so as to cover partially an area of the curved portion having the taper angle v. As mentioned above, the steering roller bearing member 211 has degree of freedom only in the direction along the pressing direction of the tension spring 214 (direction of the arrow E in FIG. 6). Therefore, the steering roller bearing member 211 rubs the inner circumferential surface of the intermediary transfer belt 106 without following the conveyance of the intermediary transfer belt 106 toward a direction of an arrow R2 in FIG. 6.

Incidentally, a configuration of the rubbing portion is not limited to the configuration in the present Embodiment, but is sufficient as long as the rubbing portion is able to rub the inner circumferential surface of the intermediary transfer belt 106 and to apply force to the steering roller 202 to tilt the steering roller 202. For example, the rubbing portion is constituted by the tapered rubbing surface in the present Embodiment, but may be constituted by, for example, a rubbing surface, which goes along the circumferential surface of the steering roller 202 and having an outer diameter which is substantially the same as that of the steering roller 202. In addition, the rubbing portion is constituted by a non-rotating rubbing surface in the present Embodiment, however, it may be configured as follows. That is, it may be constituted by a circumferential surface of a rotatable member which has greater resistance to rotate than that of the steering roller 202 and which rubs the inner circumferential surface of the intermediary transfer belt 106 as the intermediary transfer belt 106 is conveyed. In addition, the rubbing portion is provided to the steering roller bearing member 211 in the present Embodiment, however, it may be provided to a different member than the steering roller bearing member 211.

Figure 7:
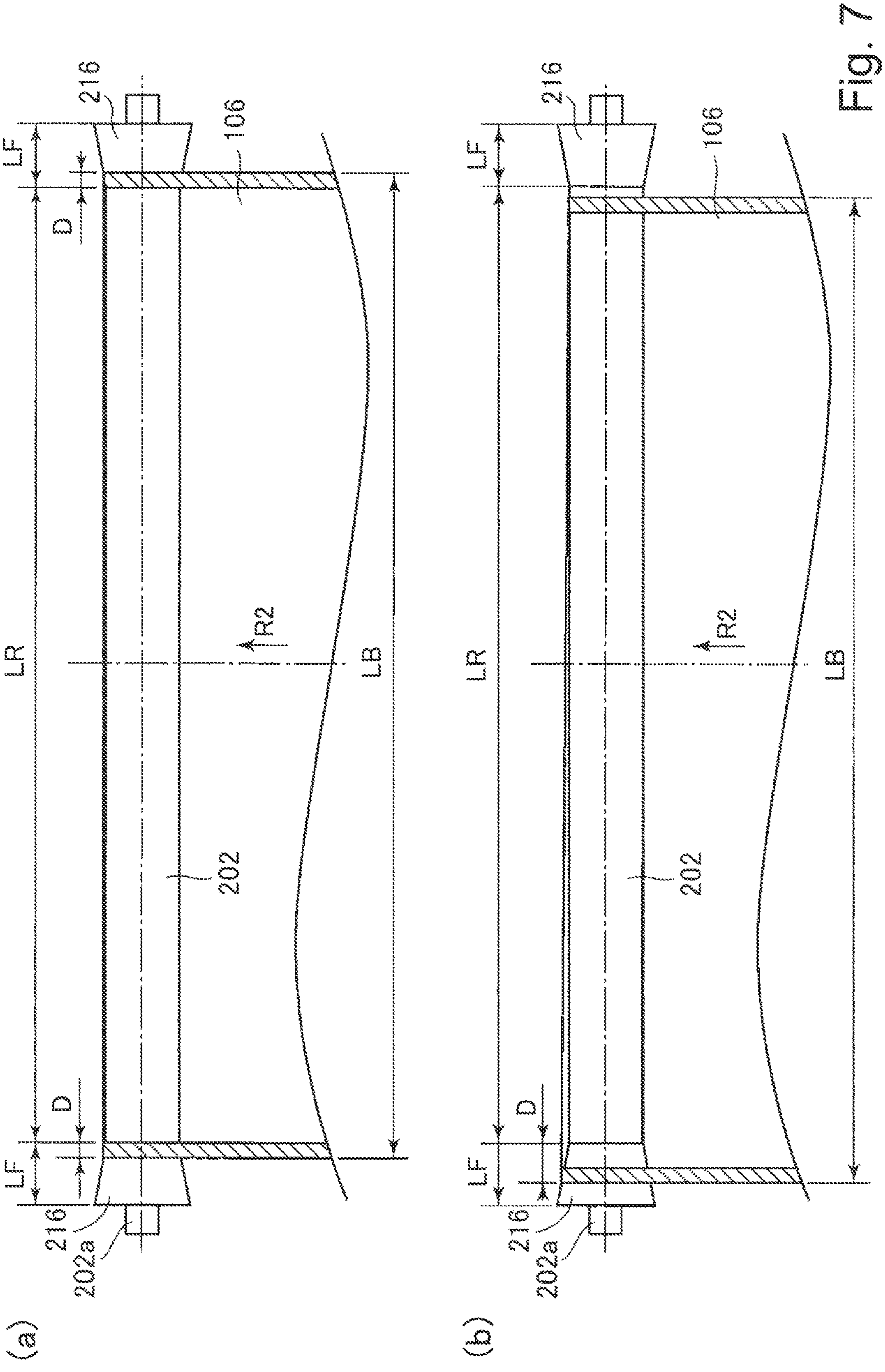
FIG. 7, part (a) and part (b), is a schematic top view to illustrate an operation of the steering mechanism.

FIG. 7, part (a) and part (b), is a schematic top view of a vicinity of the steering roller 202 as viewed from above to illustrate the operation of the steering mechanism (self alignment mechanism) 230 in the present Embodiment. Part (a) of FIG. 7 illustrates a state in which the conveyance position (a hanging position) of the intermediary transfer belt 106 is in a nominal (center) position (a steady state in which the frictional force on both end portions of the intermediary transfer belt 106 in the widthwise direction are balanced by the self alignment) when the intermediary transfer belt 106 is conveyed in a direction of an arrow R2 in part (a) of FIG. 7. Part (b) of FIG. 7 illustrates a state in which the shift of the intermediary transfer belt 106 to a left side (front side) in part (b) of FIG. 7 occurs when the intermediary transfer belt 106 is conveyed in the direction of the arrow R2 in part (b) of FIG. 7.

In the present Embodiment, a width LB of the intermediary transfer belt 106 is set as follows, as shown in part (a) of FIG. 7. That is, the width LB is set to be longer than a width LR in the rotational axis direction of the steering roller 202 and is shorter than a width LR+2LF, which is a width where widths LF of each sliding ring portion 216 are added to the width LR in the rotational axis direction of the steering roller 202 (width between both end portions of the steering roller bearing member 211). As shown in part (a) of FIG. 7, in the nominal state, the intermediary transfer belt 106 rubs against both steering roller bearing members 211 with a predetermined hanging width D (2 mm, for example, in the present Embodiment). Thus, a positional relationship between the intermediary transfer belt 106 and the pair of steering roller bearing members 211 in the state of part (a) of FIG. 7 in which the intermediary transfer belt 106 is evenly positioned in the center with respect to the rotational axis direction of the steering roller 202 is as follows. That is, the positional relationship is that both end portions of the intermediary transfer belt 106 in the widthwise direction are covering a part of the sliding ring portion 216 of the pair of the steering roller bearing members 211.

In contrast, as shown in part (b) of FIG. 7, in the case in which the shift of the intermediary transfer belt 106 occurs, the hanging width between the intermediary transfer belt 106 and the steering roller bearing member 211 becomes unbalanced between the left side in part (b) of FIG. 7 and the right side in part (b) of FIG. 7. In the example of part (b) of FIG. 7, it is assumed to be in an unbalanced state in which only the left side of part (b) of FIG. 7 has the hanging width D. In addition, dynamic friction force per unit length of the intermediary transfer belt 106 in the widthwise direction between the sliding ring portion 216 and the inner circumferential surface of the intermediary transfer belt 106 is defined as FS. In this case, the steering roller bearing member 211 is subjected to force of FS*D on the left side in part (b) of FIG. 7 downward (toward a back side of the paper in part (b) of FIG. 7) and force of 0 on the right side in part (b) of FIG. 7, respectively. It is the difference in the frictional force between the sliding ring portion 216 and the inner circumferential surface of the intermediary transfer belt 106 at both end portions of the intermediary transfer belt 106 in the widthwise direction that is driving force which generates moment FS*D about the steering axis line J (FIG. 5). Under the assumption of part (b) of FIG. 7, the direction of the moment FS*D is in a direction that the left side in part (b) of FIG. 7 is going down (direction toward the back side of the paper in part (b) of FIG. 7). In other words, the sliding ring portions 216 of the pair of the steering roller bearing members 211 generate the frictional force to tilt the steering roller 202 in accordance with a rubbing width with the inner circumferential surface of the intermediary transfer belt 106 in the rotational axis direction of the steering roller 202, respectively.

Figure 8:
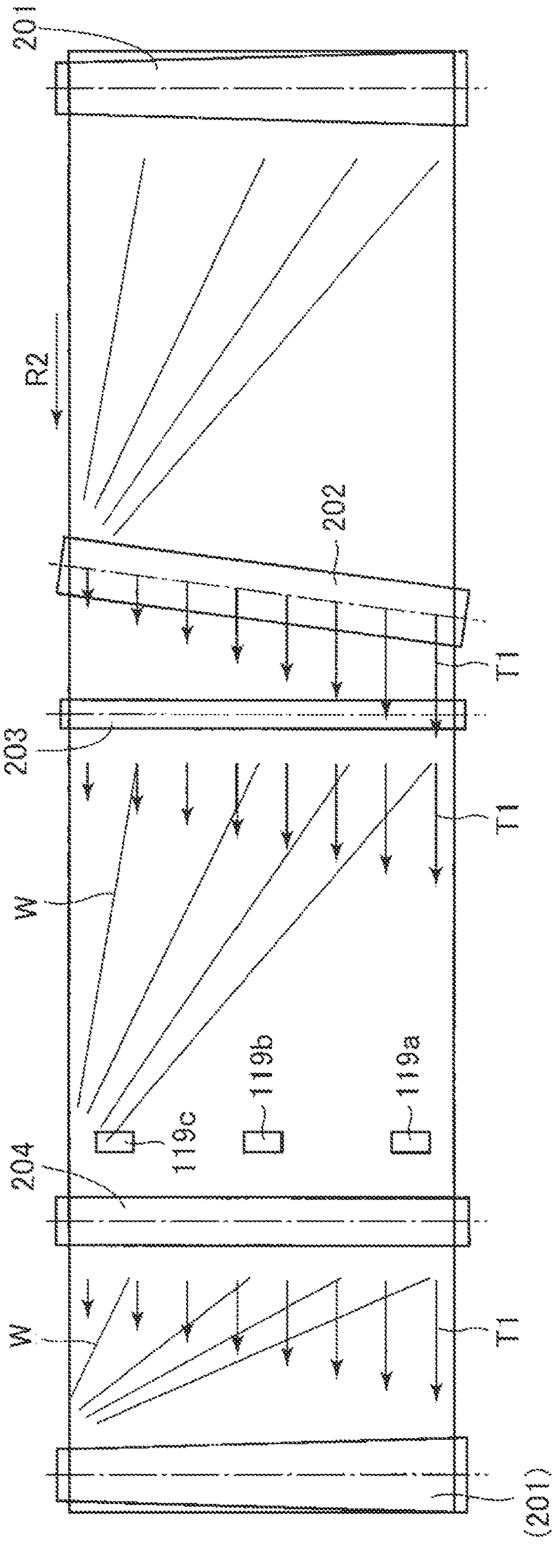
FIG. 8 is a schematic view illustrating an example of tension distribution of the intermediary transfer unit.

FIG. 8 is a schematic view illustrating an example of tension distribution of the intermediary transfer belt 106 stretched from the steering roller 202, toward downstream in the conveyance direction (direction of an arrow R2 in FIG. 8) of the intermediary transfer belt 106, to the driving roller 201. FIG. 8 illustrates a state in which the intermediary transfer belt 106 is expanded along the conveyance direction thereof, and the intermediary transfer belt 106 is viewed from the outer circumferential surface side. In addition, in FIG. 8, in the configuration of the present Embodiment, it is assumed that the driving roller 201 has, for example, a tapered shape as a cause of the shift of the intermediary transfer belt 106. Here, in particular, it is assumed that the driving roller 201 has the tapered shape whose diameter increases from the rear side (upper side in FIG. 8) to the front side (lower side in FIG. 8) with respect to the rotational axis direction (widthwise direction of the intermediary transfer belt 106). Incidentally, as described above, the cause of the shift of the intermediary transfer belt 106 is not limited to accuracy of the outer diameter of the driving roller 201.

In the case in which the driving roller 201 has the tapered shape which becomes thicker from the rear side (upper side in FIG. 8) to the front side (lower side in FIG. 8), the following occurs. That is, difference in a conveyance speed of the intermediary transfer belt 106 is generated in the widthwise direction of the intermediary transfer belt 106 so that the conveyance speed on a side with a larger outer diameter of the driving roller 201 (front side, lower side in FIG. 8) is faster. It causes the intermediary transfer belt 106 to shift to the front side (lower side in FIG. 8), and the steering roller 202 tilts in the direction of the arrow Q in FIG. 5. In other words, the steering roller 202 tilts so that the front side (lower side in FIG. 8) in the rotational axis direction thereof moves below and the rear side (upper side in FIG. 8) in the rotational axis direction thereof moves above. Here, tension T1 applied to the intermediary transfer belt 106 by the steering roller 202 becomes higher on the downstream side in the movement direction of the conveyance position (higher on the lower side in FIG. 8) of the intermediary transfer belt 106. In other words, under the assumption of FIG. 8, the tension T1 applied to the intermediary transfer belt 106 by the steering roller 202 is higher on the front side (lower side in FIG. 8). And the larger a tilt amount of the steering roller 202, the larger the difference in the tension T1 in the widthwise direction of the intermediary transfer belt 106.

4-3. Other Examples of the Steering Mechanism

Here, other examples of the steering mechanism will be described with reference to FIG. 9, FIG. 10 and FIG. 11. In the examples shown in FIG. 9, FIG. 10 and FIG. 11, elements having the same or corresponding functions or configurations as those in the present Embodiment are marked with the same reference numerals.

Figure 9:
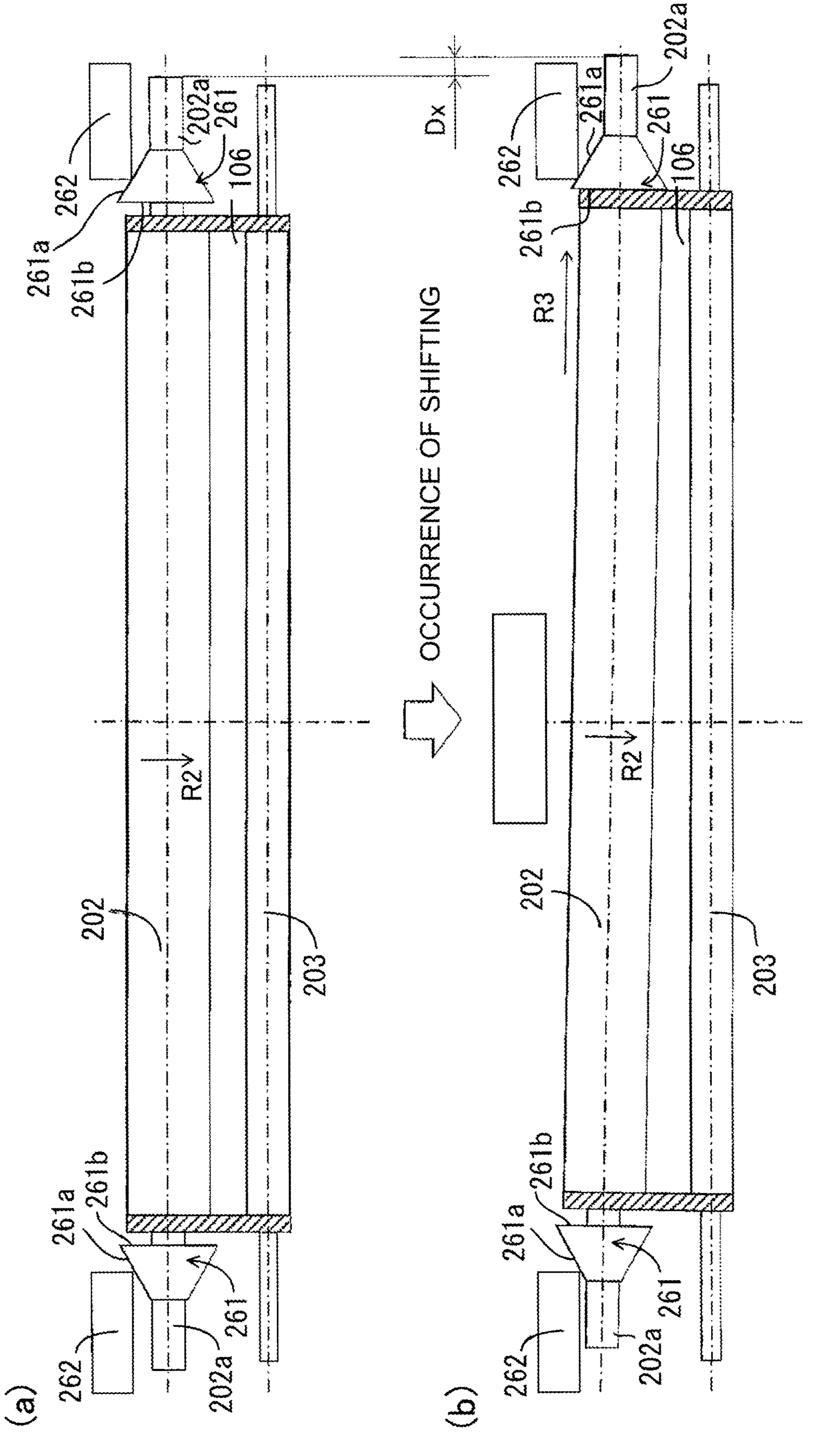
FIG. 9, part (a) and part (b), is a schematic side view illustrating a configuration of a second example of the steering mechanism.

FIG. 9, part (a) and part (b), is a schematic top view of a configuration of a second example of the steering mechanism. Part (a) of FIG. 9 illustrates a state in which the shift of the intermediary transfer belt 106 is not occurring, and part (b) of FIG. 9 illustrates a state in which the shift of the intermediary transfer belt 106 (as an example, the shift toward a right side in FIG. 9 (front side)) occurs. In this steering mechanism, the steering roller 202, which is at least one of rollers which stretch the intermediary transfer belt 106, is held by the frame 240 of the intermediary transfer unit 200 rotatably and movably in the rotational axis direction. In addition, on the steering roller shafts 202*a* of both end portions in the rotational axis direction of the steering roller 202, tilting members 261 having an inclined surface 261*a* on an outer circumference are fixed and attached, respectively. As shown in part (a) of FIG. 9, the inclined surface 261*a* of the tilting member 261 is in contact with a contacting member 262 which is provided on the frame 240 side. A shape of the inclined surface 261*a* of the tilting member 261 may be any shape as long as a distance between the rotational axis of the steering roller 202 and the contacting member 262 varies depending on a contact position on the inclined surface 261*a* with the contacting member 262, such as a conical surface, a spherical surface, or the like. In the example of FIG. 9, the conical shape is employed as the shape of the inclined surface 261*a* of the tilting member 261. When the shift of the intermediary transfer belt 106 occurs from the state shown in part (a) of FIG. 9, the intermediary transfer belt 106 moves in the rotational axial direction of the steering roller 202, and an end portion of the intermediary transfer belt 106 in the widthwise direction pushes a flange portion 261*b* of the tilting member 261. As a result, as shown in part (b) of FIG. 9, the steering roller 202 also moves in the rotational axis direction (a moving amount is shown as Dx). As the steering roller 202 moves in this manner, as shown in part (b) of FIG. 9, the contact position between the contacting member 262 and the inclined surface 261*a* of the tilting member 261 changes. By this operation, the steering roller 202 tilts and the shift of the intermediary transfer belt 106 is corrected.

Figure 10:
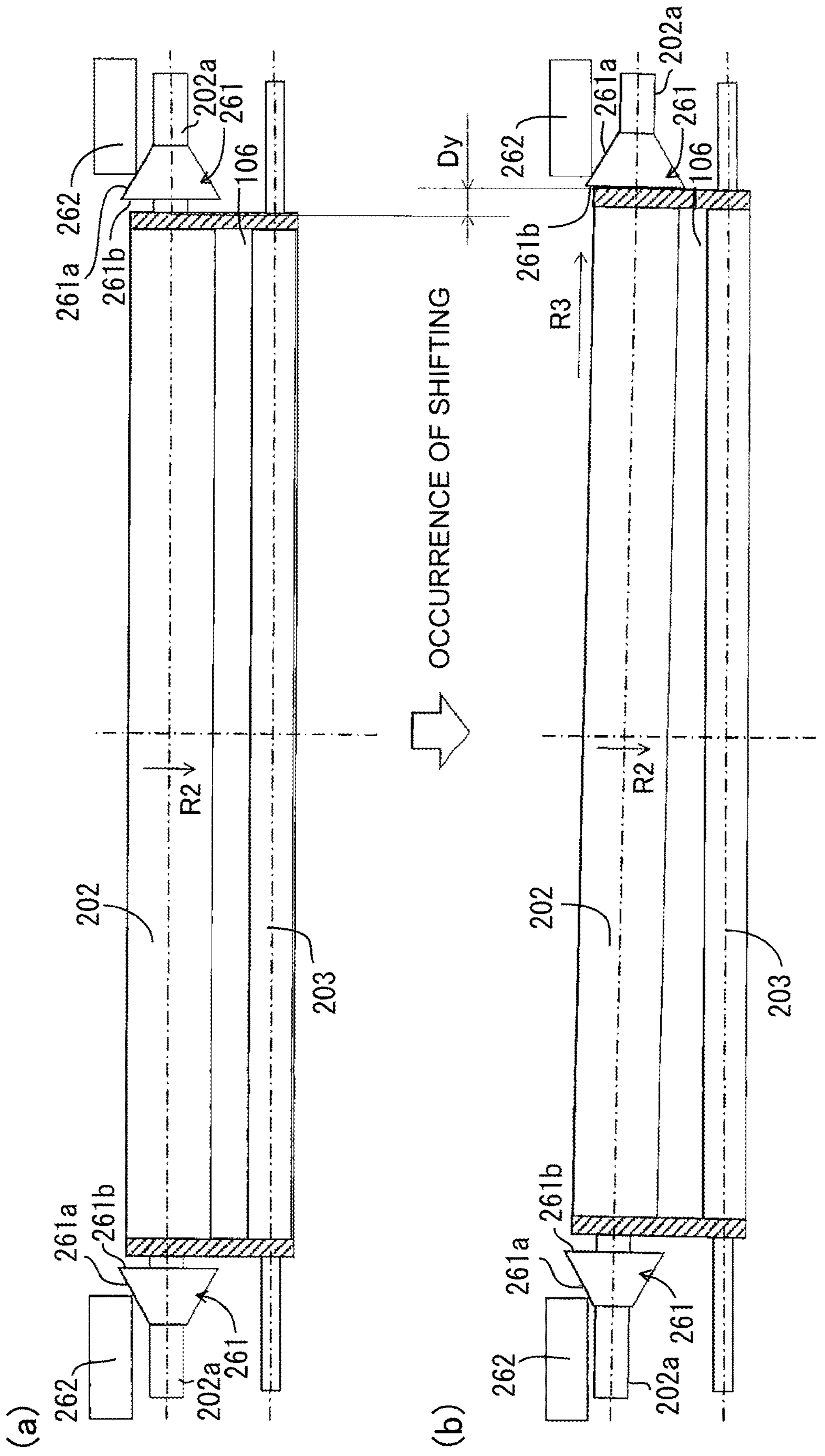
FIG. 10, part (a) and part (b), is a schematic side view illustrating a configuration of a third example of the steering mechanism.

In addition, FIG. 10 is a schematic top view of a configuration of a third example of the steering mechanism. Part (a) of FIG. 10 illustrates a state in which the shift of the intermediary transfer belt 106 is not occurring, and part (b) of FIG. 10 illustrates a state in which the shift of the intermediary transfer belt 106 (as an example, the shift toward a right side in FIG. 10 (front side)) occurs. In this steering mechanism, the steering roller 202 is held by the frame 240 rotatably but not movably in the rotational axis direction. In addition, on the steering roller shafts 202*a* of both end portions in the rotational axis direction of the steering roller 202, tilting members 261 having an inclined surface 261*a* on an outer circumference are movably attached in the rotational axis direction of the steering roller 202. As shown in part (a) of FIG. 10, the inclined surface 261*a* of the tilting member 261 is in contact with a contacting member 262 which is provided on the frame 240 side. As in the second example of the steering mechanism shown in FIG. 9, a shape of the inclined surface 261*a* of the tilting member 261 may be a conical surface, a spherical surface, or the like, however, the conical shape is employed in the example shown in FIG. 10. When the shift of the intermediary transfer belt 106 occurs from the state shown in part (a) of FIG. 10, the intermediary transfer belt 106 moves in the rotational axial direction of the steering roller 202, and an end portion of the intermediary transfer belt 106 in the widthwise direction pushes a flange portion 261*b* of the tilting member 261. As a result, as shown in part (b) of FIG. 10, the tilting member 261 which is hit by the end portion of the intermediary transfer belt 106 also moves in the rotational axial direction of the steering roller 202 (a moving amount is shown as Dy). As the tilting member 261 moves in the rotational axis direction of the steering roller 202, as shown in part (b) of FIG. 10, a contact position between the contacting member 262 and the inclined surface 261*a* of the tilting member 261 changes. By this operation, the steering roller 202 tilts and the shift of the intermediary transfer belt 106 is corrected.

Thus, several different configurations of the self alignment mechanisms are possible, however, every configuration is what tilts the steering roller 202. Therefore, for example, when the steering roller 202 is tilted so that the front side (right side in FIG. 9 and FIG. 10) moves below and the rear side (left side in FIG. 9 and FIG. 10) moves above in the rotational axis direction of the steering roller 202, then the following occurs. That is, difference in tension T1 in the widthwise direction of the intermediary transfer belt 106 as shown in FIG. 8 is generated in the intermediary transfer belt 106 due to the tilt of the steering roller 202.

Figure 11:
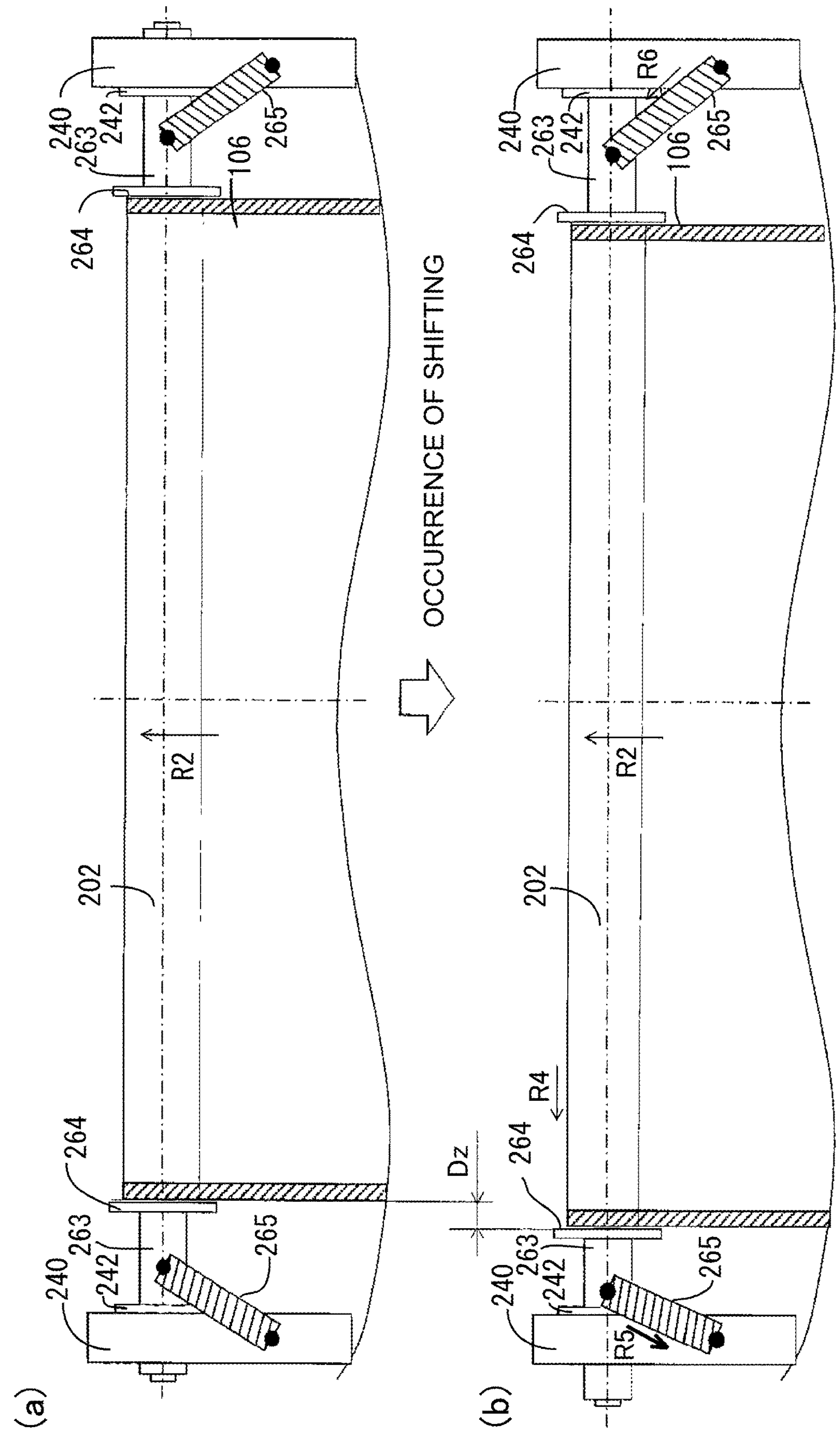
FIG. 11, part (a) and part (b), is a schematic top view illustrating a configuration of a fourth example of the steering mechanism.

In addition, the self alignment mechanism may be configured as shown in FIG. 11. FIG. 11, part (a) and part (b), is a schematic top view of a configuration of a fourth example of the steering mechanism. Part (a) of FIG. 11 illustrates a state in which the shift of the intermediary transfer belt 106 is not occurring, and part (b) of FIG. 11 illustrates a state in which the shift of the intermediary transfer belt 106 occurs (as an example, the shift toward a left side (front side) in FIG. 11). In this steering mechanism, the steering roller 202 is held by the frame 240 rotatably and movably in the rotational axis direction. In addition, in this steering mechanism, flanges 264 of which outer diameters are larger than that of the steering roller 202, are provided adjacent to the end portion of the intermediary transfer belt 106 in the widthwise direction on both end sides of the rotational axis direction of the steering roller 202, respectively. In addition, steering roller bearings 263, which hold the steering roller 202 on both end sides in the rotational axis direction of the steering roller 202, respectively, are provided so as to be in contact with the flange 264 or are integrally formed with the flanges 264, respectively. And the steering roller bearing 263 is held by the frame 240. A steering roller holding portion 242 provided in the frame 240 includes a long hole (groove) shape in the vertical direction in FIG. 11 (direction crossing with the rotational axial direction of the steering roller 202 on the paper of FIG. 11, that is, direction parallel to the direction of the arrow R2). And the steering roller bearing 263 is movable within the steering roller holding portion 242 of the long hole (groove) shape. Furthermore, in this steering mechanism, urging members 265 are provided on both end sides in the rotational axis direction of the steering roller 202. Each urging member 265 is provided, for example, between the frame 240 and the steering roller bearing 263, and urges the steering roller bearing 263 from both end sides in the rotational axis direction of the steering roller 202 to a center side in the rotational axis direction of the steering roller 202, respectively. As shown in part (a) of FIG. 11, in a normal state, since the same force is applied from both end sides in the rotational axis direction of the steering roller 202, the intermediary transfer belt 106 is in a state in which the intermediary transfer belt 106 is positioned at the center and tension is equally applied thereto. However, in a case in which the shift of the intermediary transfer belt 106 occurs, for example, in a direction of an arrow R4 in FIG. 11 (a direction toward a left side (front side)) due to variations in components, etc., the following occurs. That is, the end portion of the intermediary transfer belt 106 in the widthwise direction pushes the flange 264, which is positioned in a shifting direction of the intermediary transfer belt 106 (left side in FIG. 11), to the rotational axis direction of the steering roller 202. By this, as shown in part (b) of FIG. 11, the steering roller bearing 263 is also pushed to the rotational axis direction of the steering roller 202 (moving amount is shown as Dz) and the urging member is compressed in a direction of an arrow R5 in FIG. 11. In addition, on the opposite side of the shifting direction of the intermediary transfer belt 106 (right side in FIG. 11), by the steering roller bearing 263 and the flange 264 moving in the shifting direction of the intermediary transfer belt 106, the urging member 265 extends in a direction of an arrow R6 in FIG. 11. Thus, when the intermediary transfer belt 106 moves in the shifting direction toward the left side (front side) in FIG. 11, the urging member 265 of the left side is compressed and the urging member 265 of the right side is extended. Incidentally, at the same time, the steering roller 202 may tilt by the steering roller bearing 263 moving within the steering roller holding portion 242 of the long hole (groove) shape described above. By such moving of the intermediary transfer belt 106, the tension of the intermediary transfer belt 106 in the moving direction (left side in FIG. 11) gets larger. By this, difference in the tension T1 with respect to the widthwise direction of the intermediary transfer belt 106 occurs in the intermediary transfer belt 106 as shown in FIG. 8.

4-4. Slack of the Intermediary Transfer Belt

As described above, in the situation where the difference in the tension T1 with respect to the widthwise direction of the intermediary transfer belt 106 is occurring, the circumferential length of the intermediary transfer belt 106 is substantially the same in the widthwise direction of the intermediary transfer belt 106. Therefore, in the widthwise direction of the intermediary transfer belt 106, the intermediary transfer belt 106 is taut on a side where the tension is strong, and slack thereof occurs on a side where the tension is weak.

5. Problems Caused by a Waving

FIG. 12 is a schematic perspective view of the intermediary transfer unit 200 illustrating a stretched state of the intermediary transfer belt 106 when there is the difference in the tension with respect to the widthwise direction of the intermediary transfer belt 106 under the same assumption as in FIG. 8. In FIG. 12, an illustration of the belt cleaner 117 is omitted and the recording material P and the sensor unit 119 are also illustrated. In addition, in FIG. 12, the rear side is illustrated in the near side of the paper. In addition, FIG. 12 schematically illustrates a state of a case in which the intermediary transfer unit 200 is driven in the all contacting state.

As described with reference to FIG. 8, in a case in which the steering roller 202 is tilted in a direction of an arrow Q in FIG. 12 (FIG. 5), i.e., the front side (back side in FIG. 12) moves below and the rear side (near side in FIG. 12) moves above, the following occurs. That is, the rear side (near side in FIG. 12) of the intermediary transfer belt 106 will be slack and the front side (back side in FIG. 12) will be taut. In this case, for example, the intermediary transfer belt 106, which constitutes a surface from the pre-primary transfer roller 203 to the pre-secondary transfer roller 204 (lower surface, primary transfer surface) H1 in the conveyance direction of the intermediary transfer belt 106, becomes as follows. That is, parts supported by the stretching rollers (the pre-primary transfer roller 203 and the pre-secondary transfer roller 204) and parts nipped between the primary transfer rollers 105 and the photosensitive drums 101 are defined as nodes, and parts between the nodes are defined as antinodes. In this case, a "waving", which is a phenomenon in which the intermediary transfer belt 106 flaps at the part of the antinode, occurs (W in FIG. 8 and FIG. 12). In a system (intermediary transfer unit 200) in which the waving occurs due to the difference in the outer diameter in the rotational axis direction of the driving roller 201 or the like, the waving tends to occur regularly when the intermediary transfer belt 106 is being conveyed.

In the present Embodiment, in cases in which the waving occurs on a surface (detecting surface) HR, which includes a detecting position of the sensor unit 119, or on a secondary transfer front surface H2 in the intermediary transfer belt 106, problems due to the waving may occur.

First, a problem in the case in which the waving occurs on the detecting surface HR of the sensor unit 119 will be described. The sensor portions 119*a*, 119*b* and 119*c*, which are used as the registration patch detecting sensor and the density patch detecting sensor of the sensor unit 119, are constituted by an optical sensor (reflection-type optical sensor), which includes a light emitting element and a light receiving element, respectively. The sensor portions 119*a*, 119*b* and 119*c* irradiate the front surface of the intermediary transfer belt 106 with light by the light emitting elements (arrow H in FIG. 12). In addition, the sensor portions 119*a*, 119*b* and 119*c* receive light reflected from the intermediary transfer belt 106 or from the toner image on the intermediary transfer belt 106 by the light receiving elements (arrow U in FIG. 12). And the control portion 130 measures density and a position of the toner image transferred on the surface of the intermediary transfer belt 106 based on signals output by the sensor portions 119*a*, 119*b* and 119*c* in response to intensity of the reflected light. The measured density information of the toner image is used for the density correction, and a positional information of the toner image is used for the color misalignment correction. However, if there is the waving W on the surface of the intermediary transfer belt 106, which is sensed by the sensor unit 119, for example, the reflected light from the surface of the intermediary transfer belt 106 does not reach the light receiving element properly, and false detection, such that the toner image is not detected though there is the toner image, may occur. As described above, in the system where the waving occurs, the waving tends to occur regularly. Therefore, if degree of the waving is large, the density correction or the color misalignment correction may fail in every attempt.

Next, a problem in the case in which the waving occurs on the secondary transfer front surface H2 will be described. The recording material P onto which the toner image is transferred enters the secondary transfer portion N2 so as to follow the secondary transfer front surface H2 after the leading end portion of the recording material P reaches the secondary transfer portion N2. At this moment, if the waving W occurs on the secondary transfer front surface H2, the toner image carried on the secondary transfer front surface H2 of the intermediary transfer belt 106 follows the recording material P with waving. Then, the recording material P and the toner image rub against each other, and the image is disturbed on the secondary transfer front surface H2. And the disturbed image is then transferred secondarily to the recording material P, which may result in an image defect.

6. Pre-Secondary Transfer Roller Alignment Adjusting Mechanism

Next, the pre-secondary transfer roller alignment adjusting mechanism (here, also simply referred to as an "adjusting mechanism") for suppressing the waving of the intermediary transfer belt 106 in the present Embodiment will be described.

6-1. Configuration of the Adjusting Mechanism

Figure 13:
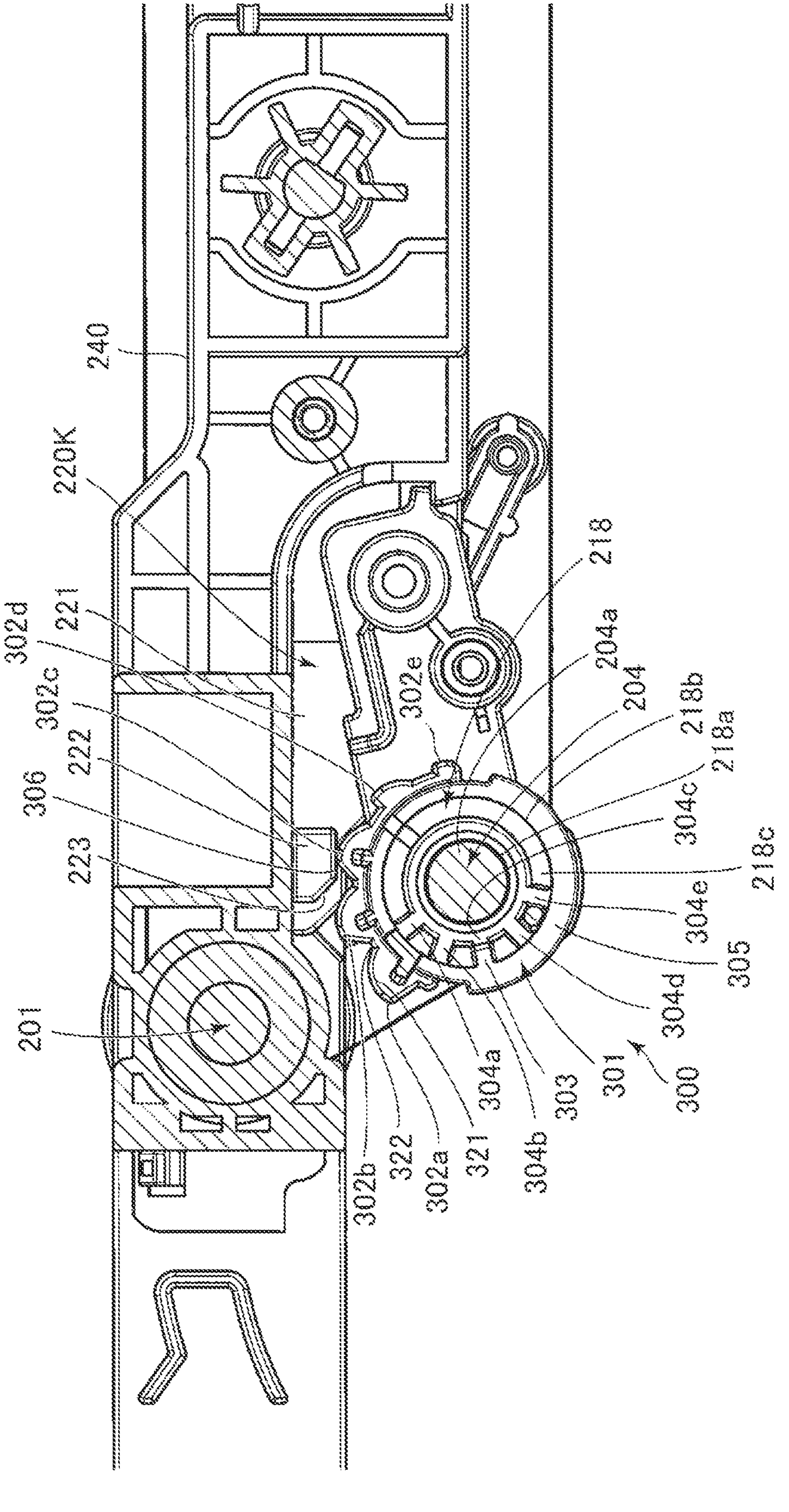
FIG. 13 is a side view of a vicinity of an adjusting mechanism.
Figure 14:
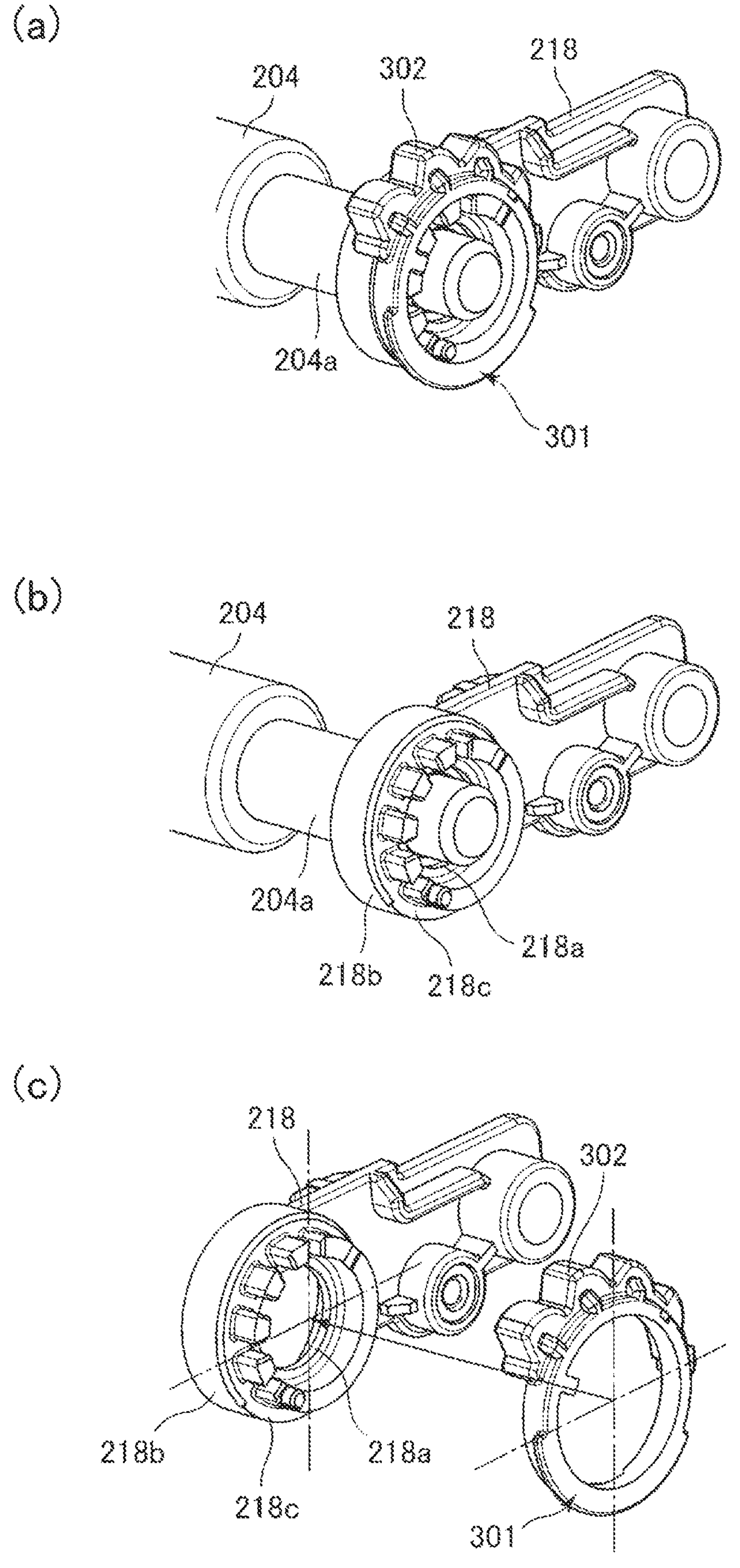
FIG. 14, part (a), part (b) and part (c), is a perspective view of a pre-secondary transfer roller bearing member with an adjusting ring being attached, a perspective view of the pre-secondary transfer roller bearing member with the adjusting ring being removed and an exploded perspective view illustrating a state in which the adjusting ring is removed from the pre-secondary transfer roller bearing member.

FIG. 13 is a side view illustrating a vicinity of the pre-secondary transfer roller 204 in the intermediary transfer unit 200 to illustrate an adjusting mechanism 300 in the present Embodiment. Part (a) of FIG. 14 is a perspective view illustrating the pre-secondary transfer roller bearing member 218 with an adjusting ring 301, which will be described below, being attached. Part (b) of FIG. 14 is a perspective view illustrating the pre-secondary transfer roller bearing member 218 in a state in which the adjusting ring 301, which will be described below, is removed. In addition, Part (c) of FIG. 14 is an exploded perspective view illustrating a state in which the adjusting ring 301, which will be described below, is removed from the pre-secondary transfer roller bearing member 218. In FIG. 13 and FIG. 14, the rear side is illustrated in the near side of the paper. In addition, FIG. 13 illustrates a state in which the intermediary transfer unit 200 is in the all contacting state or the black contacting state.

In the present Embodiment, the adjusting mechanism 300 is provided in the intermediary transfer unit 200 to enable adjustment of alignment of the pre-secondary transfer roller 204 relative to the driving roller 201. In the present Embodiment, as further described below, the alignment of the pre-secondary transfer roller 204 relative to the driving roller 201 is performed with the adjusting mechanism 300 before shipping of the image forming apparatus 100 or the intermediary transfer unit 200 from a factory. In the present Embodiment, the adjusting mechanism 300 is provided on one end side of the intermediary transfer belt 106 in the widthwise direction. In particular, in the present Embodiment, the adjusting mechanism 300 is provided on an end portion of the rear side of the intermediary transfer belt 106 in the widthwise direction. Incidentally, in the description of the adjusting mechanism 300, the pre-secondary transfer roller bearing member 218 and related elements thereof are what are on the rear side, unless otherwise mentioned in particular.

The adjusting mechanism 300 is configured to adjust an angle of the rotational axis direction of the pre-secondary transfer roller 204 relative to the rotational axis direction of the driving roller 201 by adjusting a position of the pre-secondary transfer roller bearing member 218, which supports the pre-secondary transfer roller 204 rotatably. In particular, in the present Embodiment, the adjusting mechanism 300 is configured to adjust a position of one end side (rear side) of the pre-secondary transfer roller bearing member 218 in the widthwise direction of the intermediary transfer belt 106 in the all contacting state or the black contacting state in the vertical direction. As a result, the adjusting mechanism 300 can change the alignment of the pre-secondary transfer roller 204 relative to the driving roller 201 by moving the one end side (rear side) of the pre-secondary transfer roller 204 in the widthwise direction of the intermediary transfer belt 106 in the vertical direction. In more detail, in the present Embodiment, the adjusting mechanism 300 is configured to hold the position of the pre-secondary transfer roller bearing member 218 in the all contacting state or the black contacting state in a position when the rotational axis direction of the secondary pre-transfer roller 204 is parallel to the rotational axis direction of the driving roller 201 (reference position), a position below the reference position and a position above the reference position. By this, the adjusting mechanism 300 is configured to hold the end portion of the one end side (rear side) of the secondary pre-transfer roller 204 in the widthwise direction of the intermediary transfer belt 106 in the position when the rotational axis direction of the secondary pre-transfer roller 204 is parallel to the rotational axis direction of the driving roller 201 (reference position), a position in which the intermediary transfer belt 106 is stretched to an outer side than the reference position (position above the reference position), and a position in which the intermediary transfer belt 106 is retracted to an inner side than the reference position (position below the reference position).

In the present Embodiment, the adjusting mechanism 300 is configured to include the pre-secondary transfer roller bearing member 218, the adjusting ring 301, which is attached to the pre-secondary transfer roller bearing member 218, and a positioning surface 306 against which an adjusting surface 302 being provided on the adjusting ring 301 abuts.

The pre-secondary transfer roller bearing member 218 includes a supporting hole 218*a* which supports a pre-secondary transfer roller shaft 204*a*, which is a rotary shaft member protruding from an end portion in the rotational axis direction of the pre-secondary transfer roller 204. In addition, the pre-secondary transfer roller bearing member 218 includes an edge portion 218*c* having an outer circumferential portion (outer circumferential surface) 218*b* of a substantially cylindrical shape around the supporting hole 218*a*.

The adjusting ring 301 as an adjusting member is attached so as to be fitted to the outer circumferential portion 218*b* of the edge portion 218*c* of the secondary transfer roller bearing member 218. The adjusting ring 301 includes an annular portion 305, which is substantially circular and covers the edge portion 218*c* of the pre-secondary transfer roller bearing member 218. The annular portion 305 includes a cap-like shape, which is concave in the pre-secondary transfer roller bearing member 218 side, and a center portion thereof is an opening in a substantially circular shape so that an end surface of the edge portion 218*c* of the pre-secondary transfer roller bearing member 218 is exposed outside. The annular portion 305 of the adjusting ring 301 includes a plurality of adjusting surfaces 302 (302*a*, 302*b*, 302*c*, 302*d* and 302*e*) having a protruding shape as contacting portions (contacting surfaces) having different heights in a radial direction (distances from the rotational axis) of the pre-secondary transfer roller 204. Top portions of the protruding shape formed on the annular portion 305 of the adjusting ring 301 are the adjusting surfaces 302 (302*a*, 302*b*, 302*c*, 302*d* and 302*e*). In the present Embodiment, in the adjusting ring 301, the five adjusting surfaces 302*a*, 302*b*, 302*c*, 302*d* and 302*e*, that is, a first adjusting surface 302*a*, a second adjusting surface 302*b*, a third adjusting surface 302*c*, a fourth adjusting surface 302*d*, and a fifth adjusting surface 302*e* are provided, of which the height gets lowered in clockwise direction in FIG. 13 from the first adjusting surface 302*a*, which has the highest height, to the fifth adjusting surface 302*e*, which has the lowest height. These adjusting surfaces 302*a* through 302*e* are radially arranged about a center portion of the adjusting ring 301 (rotational axis of the pre-secondary transfer roller 204) as a center. The position of the pre-secondary transfer roller bearing member 218 (end portion of the pre-secondary transfer roller 204) is determined by any of these five adjusting surfaces 302*a* through 302*e* being in contact with (abutting to) the positioning surface 306 as an abutting portion (abutting surface), which is provided to a slider 221 constituting the second separating mechanism 220K as a member of the frame 240 side of the intermediary transfer unit 200.

The adjusting surface 302*a*, 302*b*, 302*c*, 302*d* or 302*e* which is in contact with the positioning surface 306 may be selected arbitrarily. In the present Embodiment, in the edge portion 218*c* of the pre-secondary transfer roller bearing member 218, a plurality of positioning grooves 304 (304*a*, 304*b*, 304*c*, 304*d* and 304*e*) having concave shapes cut from an outside toward the center side in the rotational axis direction of the pre-secondary transfer roller 204 are provided, which are disposed radially arranged about the center portion of the adjusting ring 301 (rotational axis of the pre-secondary transfer roller 204) as a center, as positioning portions on the bearing member side. In the present Embodiment, in the edge portion 218*c* of the pre-secondary transfer roller bearing member 218, a first positioning groove 304*a*, a second positioning groove 304*b*, a third positioning groove 304*c*, a fourth positioning groove 304*d* and a fifth positioning groove 304*e* are provided in a counterclockwise direction in FIG. 13, so as to be corresponding to the first adjusting surface 302*a* through the fifth adjusting surface 302*e*, respectively. In addition, in the annular portion 305 of the adjusting ring 301, a positioning protrusion 303 as a positioning portion on an adjusting member side is provided so as to be protruding toward the center portion of the adjusting ring 301 (rotational axis of the pre-secondary transfer roller 204). The positioning protrusion 303 is formed so as to engageable (fittable) to each of the positioning grooves 304*a* through 304*e*. And upon attaching the adjusting ring 301 to the pre-secondary transfer roller bearing member 218, the positioning protrusion 303 is engaged with one of the five positioning grooves 304*a* through 304*e*. By this, a phase (position in a rotational direction about the rotational axis of the pre-secondary transfer roller 204) of the adjusting ring 301 can be adjusted.

Figure 15:
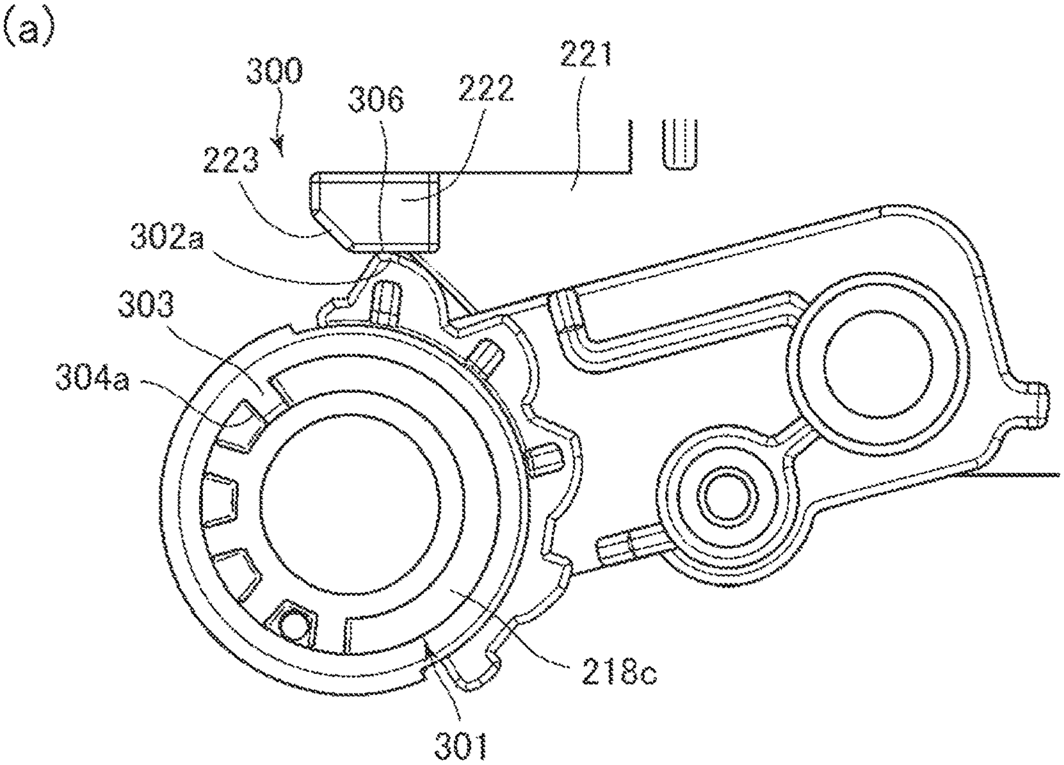
FIG. 15, part (a) and part (b), is a side view of the adjusting mechanism to illustrate adjustment of a phase of the adjusting ring.
Figure 15:
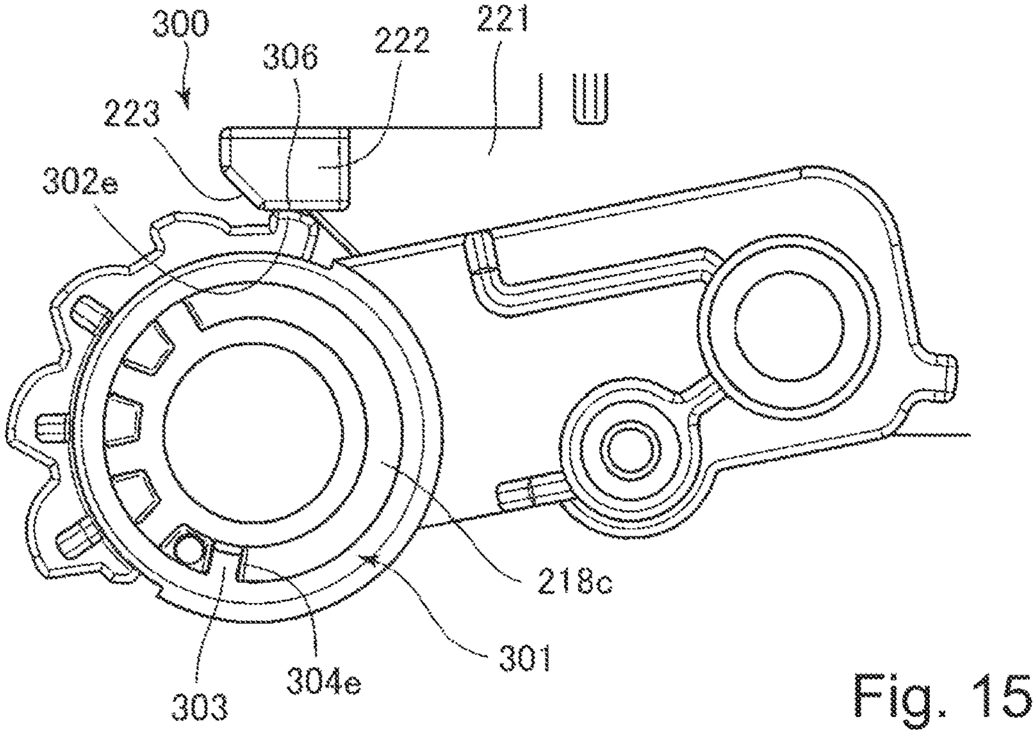

By engaging the positioning protrusion 303 with the first positioning groove 304*a*, the phase of the adjusting ring 301 can be adjusted so that the first adjusting surface 302*a* is in contact with the positioning surface 306. Similarly, by engaging the positioning protrusion 303 with the second positioning groove 304*b*, the third positioning groove 304*c*, the fourth positioning groove 304*d* or the fifth positioning groove 304*e*, the phase of the adjusting ring 301 can be adjusted so that the second adjusting surface 302*b*, the third adjusting surface 302*c*, the fourth adjusting surface 302*d* or the fifth adjusting surface 302*e* is in contact with the positioning surface 306, respectively. In other words, by changing the positioning grooves 304*a* through 304*e* to which the positioning protrusion 303 engages, the phase of the adjusting ring 301 can be changed and the one of the adjusting surfaces 302*a* through 302*e* which is in contact with the positioning surface 306 can be changed. FIG. 13 illustrates a state in which the third adjusting surface 302*c* having the middle height is in contact with the positioning surface 306. In addition, part (a) of FIG. 15 illustrates a state in which the first adjusting surface 302*a* having the highest height is in contact with the positioning surface 306, and part (b) of FIG. 15 illustrates a state in which the fifth adjusting surface 302*e* having the lowest height is in contact with the positioning surface 306. Incidentally, the adjusting ring 301 which is attached to the pre-secondary transfer roller bearing member 218 in a desired phase may be fixed to the pre-secondary transfer roller bearing member 218 by any fixing method, such as press-fit fitting, snap-fit engagement, adhesion, fusion, or a combination thereof.

Figure 16:
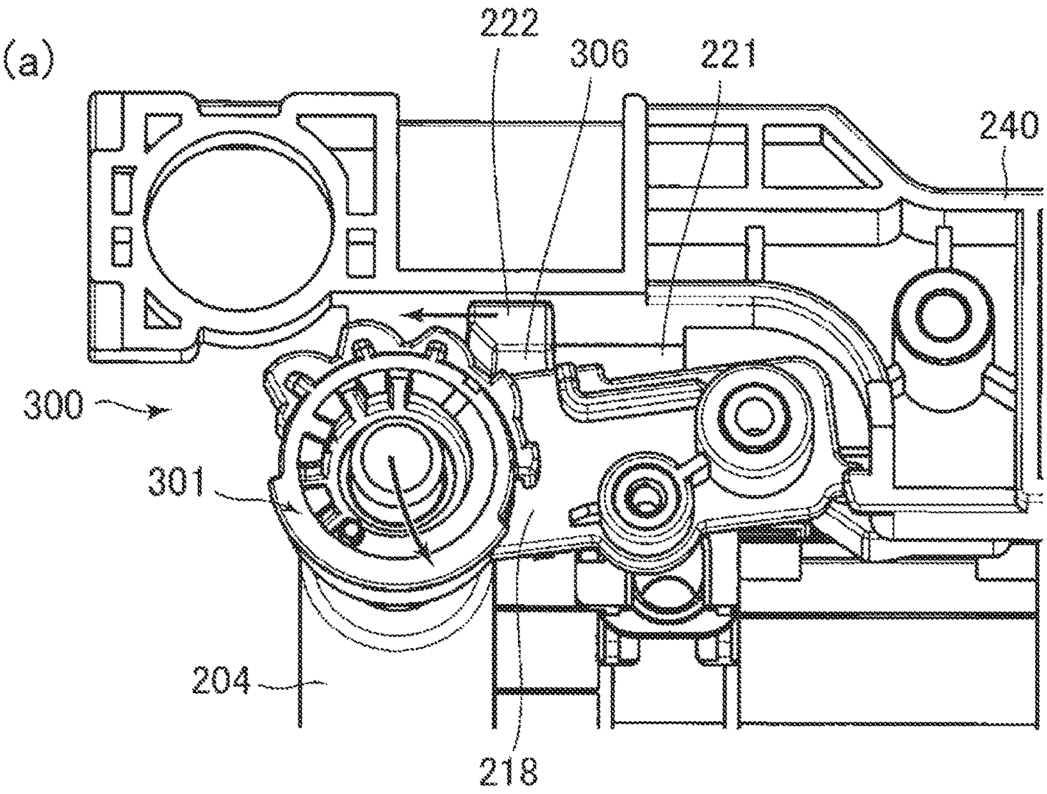
FIG. 16, part (a) and part (b), is a perspective view of a vicinity of the pre-secondary transfer roller bearing member to illustrate a configuration for moving the pre-secondary transfer roller bearing member.
Figure 16:
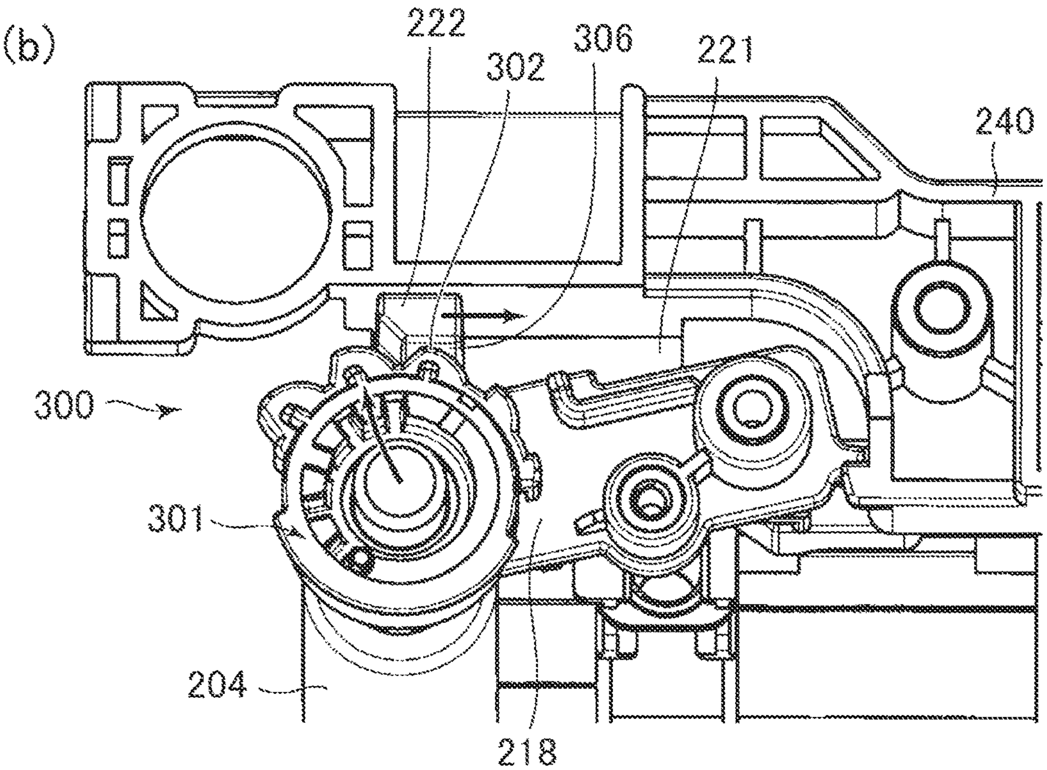

FIG. 16, part (a) and part (b), is a perspective view of a vicinity of the pre-secondary transfer roller bearing member 218 on the rear side to illustrate a moving and a positioning operation of the pre-secondary transfer roller bearing member 218 by the slider 221 which constitutes the second separating mechanism 220K. In FIG. 16, the rear side is illustrated in the near side of the paper. In the present Embodiment, as described above, the pre-secondary transfer roller 204 can be moved to the “first position” in the all contacting state or in the black contacting state described above and to the “second position” in the all separated state described above by moving the pre-secondary transfer roller bearing member 218 by the second separating mechanism 220K. As shown in part (a) and part (b) of FIG. 16, the slider 221 as a moving member constituting the second separating mechanism 220K is attached to the frame 240 so as to be capable of a sliding move along the primary transfer surface H1 (FIG. 12) by driving force transmitted from a separating motor (not shown), which is provided to the apparatus main assembly 120. To the slider 221, an acting portion 222 which acts to the pre-secondary transfer roller bearing member 218 is provided. The acting portion 222 is provided so as to be protruding from a center side to an outside in the rotational axis direction of the pre-secondary transfer roller 204. And on a lower surface of this acting portion 222, the positioning surface 306 described above is provided. Incidentally, a moving amount of the pre-secondary transfer roller bearing member 218 by the slider 221 is larger than that by changing the phase of the adjusting ring 301 of the adjusting mechanism 300.

Part (a) of FIG. 16 illustrates a state in which the slider 221 is in a position where the acting portion 222 is retracted from the pre-secondary transfer roller bearing member 218. In addition, part (b) of FIG. 16 illustrates a state in which the slider 221 is in a position where the acting portion 222 is in contact with one of the adjusting surfaces 302*a* through 302*e* of the adjusting ring 301 (the third adjusting surface 302*c* in the example of the figure) via the positioning surface 306. In the state in which the slider 221 is in the position shown in part (a) of FIG. 16, the pre-secondary transfer roller 204 is placed in the second position described above by being lifted upward by the tensile force of the intermediary transfer belt 106. And the slider 221 is moved from the position shown in part (a) of FIG. 16 to the left in part (a) of FIG. 16 toward the pre-secondary transfer roller bearing member 218, that is, to the position shown in part (b) of FIG. 16. At this time, the pre-secondary transfer roller bearing member 218 is pushed downward by the acting portion 222 via the adjusting ring 301. In the state in which the slider 221 is in the position shown in part (b) of FIG. 16, the pre-secondary transfer roller 204 is pushed down against the tensile force of the intermediary transfer belt 106 and placed in the first position described above. At this time, the end portion of the rear side of the pre-secondary transfer roller 204 is pushed down to a position depending on the phase of the adjusting ring 301 (depending on which one of adjusting surfaces 302*a* through 302*e* is in contact with the positioning surface 306). An operation to change from the state shown in part (b) of FIG. 16 to the state shown in part (a) of FIG. 16 is a reverse operation to change from the state shown in part (a) of FIG. 16 to the state shown in part (b) of FIG. 16. Incidentally, in the state in which the pre-secondary transfer roller 204 is in the second position, the alignment of the pre-secondary transfer roller 204 with respect to the driving roller 201 is optional and may or may not be inclined relative to the driving roller 201.

In the present Embodiment, the positioning surface 306 is constituted by an approximately flat surface, and the adjusting surfaces 302*a* through 302*e* (top portions of the protruding portions), which are in contact with the positioning surface 306, are also formed as substantially flat surfaces. By this, a contacting state between the adjusting surfaces 302*a* through 302*e* and the positioning surface 306 is stabilized.

In addition, in the present Embodiment, for example, between the first adjusting surface 302*a* and the second adjusting surface 302*b* adjacent thereto, an inclined surface 321, which is formed so that a height in a radial direction of the pre-secondary transfer roller 204 gradually decreases from the first adjusting surface 302*a*, and a bottom portion 322 between a protruding shape, to which the first adjusting surface 302*a* is provided, and a protruding shape, to which the second adjusting surface 302*b*, is provided, are provided. Similar shapes are provided between the second adjusting surface 302*b* and the third adjusting surface 302*c*, between the third adjusting surface 302*c* and the fourth adjusting surface 302*d*, and between the fourth adjusting surface 302*d* and the fifth adjusting surface 302*e*, respectively. By this, when the pre-secondary transfer roller bearing member 218 is pushed down by the acting portion 222, collision of the acting portion 222 with portions of the adjusting ring 301 other than the predetermined adjusting surfaces 302*a* through 302*e*, which are to be in contact with the positioning surface 306, etc., can be suppressed. Therefore, the moving and the positioning of the pre-secondary transfer roller bearing member 218 can be performed smoothly.

In addition, in the present Embodiment, each of the adjusting surfaces 302*a* through 302*e* is formed as a substantially independent protruding shape separated by the bottom portion 322, which makes it easier for an operator to perform an adjustment work as described below to check whether or not the phase of the adjusting ring 301 is adjusted to a desired phase. In other words, it becomes easier to check whether or not the alignment of the pre-secondary transfer roller 204 relative to the driving roller 201 is adjusted to a desired alignment.

In addition, in the present Embodiment, the acting portion 222 of the slider 221 includes, on a leading end side in a moving direction from the position where the acting portion 222 is retracted from the adjusting ring 301 to the position where the acting portion 222 is in contact with the adjusting ring 301, an acting portion inclined surface 223 formed so that a distance from the adjusting ring 301 gradually becomes farther toward the leading end. By this, it becomes possible for the acting portion 222 to gradually push down the pre-secondary transfer roller bearing member 218 until one of the predetermined adjusting surfaces 302*a* through 302*e*, which is to be in contact with the positioning surface, is in contact with the positioning surface 306. Thus, the moving and the positioning of the pre-secondary transfer roller bearing member 218 can be performed even more smoothly.

Incidentally, in the present Embodiment, configurations of the pre-secondary transfer roller bearing member 218 and the second separation mechanism 220K on the front side are substantially the same as those on the rear side described above. However, in the present Embodiment, the adjusting mechanism 300 is not provided on the front side. Therefore, on the front side, the slider 221 of the second separating mechanism 220K is directly in contact with a contacting portion (contacting surface) provided in the secondary transfer roller bearing member 218, and performs a moving and a positioning of the secondary transfer roller bearing member 218.

In addition, in the present Embodiment, the adjusting surface 302 of the adjusting ring 301 is in contact with the positioning surface 306 provided in the slider 221 as a member on the frame 240 side, however, it is not limited to this configuration. For example, while a pre-secondary transfer roller bearing member 218, similar to the present Embodiment, may be configured to be movable by the adjusting mechanism 300 at the position same as the first position in the present Embodiment, the pre-secondary transfer roller bearing member 218 may be configured not to be moved to the second position as in the present Embodiment. In such a case, for example, it may be configured that the adjusting surface 302 of the adjusting ring 301 is to be in contact with a positioning surface 306 provided to the frame 240.

Here, the position of the pre-secondary transfer roller 204 adjusted by the adjusting ring 301 and the alignment of the pre-secondary transfer roller 204 relative to the driving roller 201 in the present Embodiment will be further described. In the present Embodiment, in a state in which the third adjusting surface 302*c* having the middle height is in contact with the positioning surface 306 (FIG. 13), the end portion of the rear side of the pre-secondary transfer roller 204 is in the same height position as the end portion of the front side thereof. In other words, in this state, the rotational axis direction of the pre-secondary transfer roller 204 is substantially parallel to the rotational axis direction of the driving roller 201. In addition, in the present Embodiment, differences in height in the radial direction of the pre-secondary transfer roller 204 between the first adjusting surface 302*a* and the second adjusting surface 302*b*, between the second adjusting surface 302*b* and the third adjusting surface 302*c*, between the third adjusting surface 302*c* and the fourth adjusting surface 302*d*, and between the fourth adjusting surface 302*d* and the fifth adjusting surface 302*e* is set to 0.5 mm, respectively. And, for example, in a state in which the first adjusting surface 301*a* having the highest height (+1 mm relative to the third adjusting surface 301*c*) is in contact with the positioning surface 306 (part (a) of FIG. 15), the end portion of the rear side of the pre-secondary transfer roller 204 is lowered more than the end portion of the front side thereof. In other words, in this state, the rotational axis direction of the pre-secondary transfer roller 204 is inclined relative to the rotational axis direction of the driving roller 201 so that the end portion of the rear side of the pre-secondary transfer roller 204 moves away from the driving roller 201 (so that the intermediary transfer belt 106 is stretched outward). In this case, the rotational axial direction of the pre-secondary transfer roller 204 is inclined relative to the rotational axis direction of the driving roller 201 so that the end portion of the rear side of the pre-secondary transfer roller 204 stretches the intermediary transfer belt 106 outward more than the end portion of the front side thereof. Conversely, for example, in a state in which the fifth adjusting surface 302*e* having the lowest height (−1 mm relative to the third adjusting surface 301*c*) is in contact with the positioning surface 306 (part (b) of FIG. 15), the end portion of the rear side of the pre-secondary transfer roller 204 is raised more than the end portion of the front side thereof. In other words, in this state, the rotational axis direction of the pre-secondary transfer roller 204 is inclined relative to the rotational axis direction of the driving roller 201 so that the end portion of the rear side of the pre-secondary transfer roller 204 is closer to the driving roller 201 (so that the intermediary transfer belt 106 is retracted inside). In this case, the rotational axis direction of the pre-secondary transfer roller 204 is inclined relative to the rotational axis direction of the driving roller 201 so that the end portion of the front side of the pre-secondary transfer roller 204 stretches the intermediary transfer belt 106 outward more than the end portion of the rear side thereof.

Thus, in the present Embodiment, it is possible to adjust the alignment of the pre-secondary transfer roller 204 relative to the driving roller 201 easily by changing the phase of the adjusting ring 301. In addition, as in the present Embodiment, the adjusting mechanism 300 can be downsized and simplified by configuring that only one end side of the pre-secondary transfer roller 204 in the widthwise direction of the intermediary transfer belt 106 is moved in the vertical direction.

<First Adjusting Method>

6-2. Adjusting Method

Figure 17:
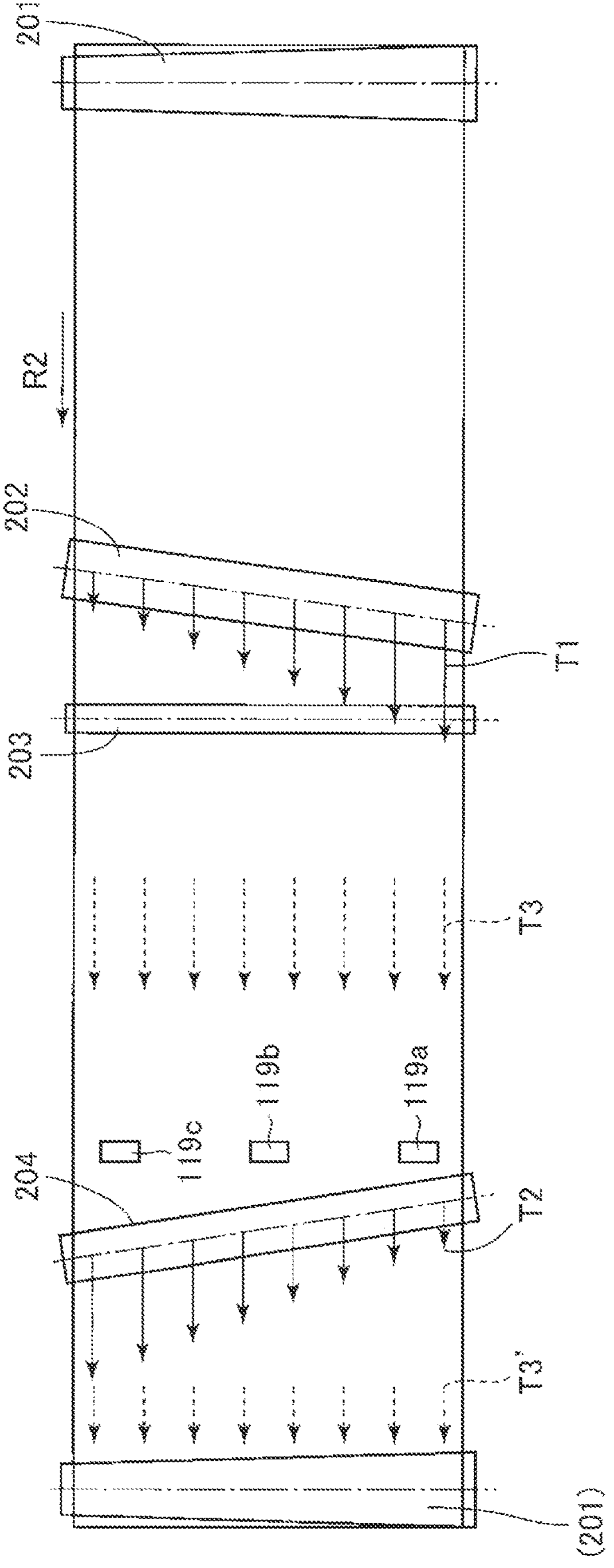
FIG. 17 is a schematic view illustrating the tension distribution of the intermediary transfer belt after adjustment of alignment of the pre-secondary transfer roller by a first adjusting method using the adjusting mechanism.

FIG. 17 is a schematic view similar to FIG. 8 illustrating the tension distribution of the intermediary transfer belt 106 in a case in which the alignment of the pre-secondary transfer roller 204 is adjusted by the adjusting mechanism 300 in a configuration where the waving occurs on the intermediary transfer belt 106 under the same assumptions as those in FIG. 8.

As shown in FIG. 17, by the steering roller 202 being tilted in the direction of the arrow Q in FIG. 5 (tilted so that the front side (lower side in FIG. 17) moves below and the rear side (upper side in FIG. 17) moves above), the difference in the tension T1 in the widthwise direction of intermediary transfer belt 106 gets larger. In this case, the waving occurs on the rear side (upper side in FIG. 17), where the tension is less in the widthwise direction of the intermediary transfer belt 106 (FIG. 8 and FIG. 12). In this case, the phase of the adjusting ring 301 of the adjusting mechanism 300 is adjusted so that the pre-secondary transfer roller 204 is inclined in a direction in which tension T2, which cancels out the difference in the tension T1 in the widthwise direction of the intermediary transfer belt 106, is generated. In other words, in this case, the phase of the adjusting ring 301 is adjusted so that the first adjusting surface 302*a* or the second adjusting surface 302*b* is in contact with the positioning surface 306 in order to lower the end portion on the rear side (upper side in FIG. 17) of the pre-secondary transfer roller 204. By this, the difference in the tension in the widthwise direction of the intermediary transfer belt 106 is decreased. As a result, tension at the detecting surface HR of the sensor unit 119 as shown in T3 and tension at the secondary transfer front surface H2 as shown in T3' are balanced in the widthwise direction of the intermediary transfer belt 106, and the excess (slack) of the intermediary transfer belt 106 is suppressed. In this manner, it becomes possible to suppress the waving of the intermediary transfer belt 106.

Incidentally, in a case in which the steering roller 202 is inclined in the opposite direction to the case in FIG. 17, the pre-secondary transfer roller 204 should be inclined in the opposite direction to the case in FIG. 17 so that the tension T2, which cancels out the difference in the tension T1 in the widthwise direction of the intermediary transfer belt 106, is generated. In other words, in this case, the phase of the adjusting ring 301 should be adjusted so that the fourth adjusting surface 302*d* or the fifth adjusting surface 302*e* is in contact with the positioning surface 306 so that the end portion of the rear side (upper side in FIG. 17) of the pre-secondary transfer roller 204 is raised.

<Second Adjusting Method>

In the first adjusting method, the inclination direction of the rotational axis direction of the pre-secondary transfer roller 204 is adjusted to generate the tension T2, which cancels out the difference in the tension T1 in the widthwise direction of the intermediary transfer belt 106, in order to suppress an occurrence of the waving. However, depending on a configuration of the intermediary transfer belt 106, it may be difficult to suppress the waving in a case in which the difference in the tension T1 generated by the steering roller 202 alone is large, even if the tension T2 is generated to cancel out the difference in the tension T1. Therefore, in the second adjusting method, posture of the pre-secondary transfer roller 204 is adjusted in advance so that the inclination direction of the pre-secondary transfer roller 204 is the same direction as the tilting direction of the steering roller 202. By this, it becomes possible to reduce the difference in the tension T1 itself generated by the steering roller 202 alone and then to suppress the waving caused by the difference in the tension T1 generated by the steering roller 202 alone.

Figure 18:
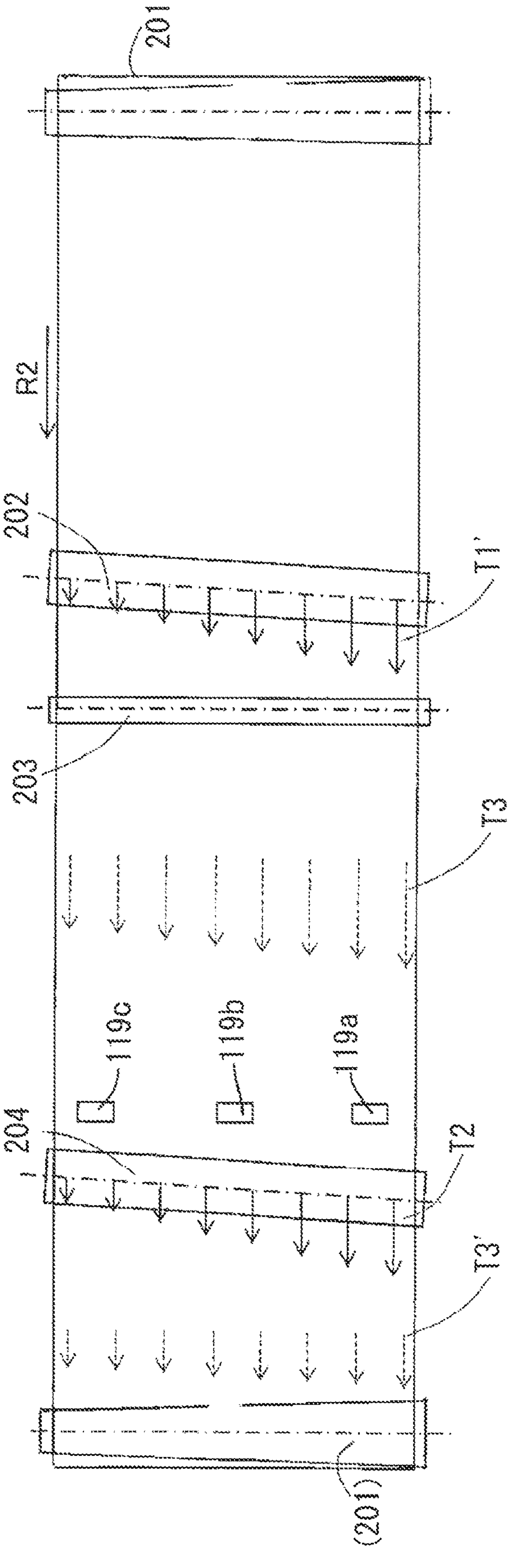
FIG. 18 is a schematic view illustrating the tension distribution of the intermediary transfer belt after the adjustment of the alignment of the pre-secondary transfer roller by a second adjusting method using the adjusting mechanism.

Hereinafter, details of the second adjusting method will be described. FIG. 18 is a schematic view for illustrating the inclination direction of the pre-secondary transfer roller 204 (schematic view illustrating the tension distribution of the intermediary transfer belt 106 as in FIG. 8) in a case in which the waving is suppressed by the second adjusting method. FIG. 18 illustrates the case in which the steering roller 202 is tilted in the direction of the arrow Q in FIG. 5 (tilted so that the front side (lower side in FIG. 18) moves below and the rear side (upper side in FIG. 18) moves above). As described above, when the steering roller 202 is tilted significantly, the difference in the tension generated by the steering roller 202 increases, which may affect the detecting surface HR of the sensor unit 119 due to the waving. Therefore, in the case in which the waving occurs due to such cause, the following may be done. That is, in order to reduce the difference in the tension T1 (FIG. 8) generated by the steering roller 202 alone, the posture of the pre-secondary transfer roller 204 is adjusted in advance so that the pre-secondary transfer roller 204 is inclined in the same direction as the tilting direction of the steering roller 202. In this manner, a shift correcting amount and the generated tension can be shared between the steering roller 202 and the pre-secondary transfer roller 204. By this, it becomes possible to reduce the difference in the tension T1 (FIG. 8) generated by the steering roller 202 alone, and then to reduce the waving which occurs on the detecting surface HR of the sensor unit 119. At this time, the posture of the pre-secondary transfer roller 204 is adjusted by adjusting the phase of the adjusting ring 301 of the adjusting mechanism 300. In other words, in the case of the example in FIG. 18, the phase of the adjusting ring 301 is adjusted so that the fourth adjusting surface 302*d* or the fifth adjusting surface 302*e* is in contact with the positioning surface 306, in order to raise the end portion of the rear side (upper side in FIG. 18) of the pre-secondary transfer roller 204.

By adjusting in this manner, the shift of the intermediary transfer belt 106, which is to be suppressed by the tilt of the steering roller 202 by the self alignment, is suppressed in advance by the inclination of the pre-secondary transfer roller 204. As a result, the tilt of the steering roller 202 due to the self alignment is reduced, and the tension generated by the steering roller 202 changes to tension T1' shown in FIG. 18, which is smaller than the tension T1 shown in FIG. 8. In addition, the sum of the difference in the tension T2 generated by the pre-secondary transfer roller 204 and difference in the tension T1' generated by the steering roller 202 above at this time is equivalent to the difference in the tension T1 (=T1'+T2). As a result, tension at the detecting surface HR of the sensor unit 119 becomes as shown as T3, and tension at the secondary transfer front surface H2 becomes as shown as T3'. In other words, each of the difference in the tension T3 and the difference in the tension T3' in the widthwise direction of the intermediary transfer belt 106 becomes smaller than in a case in which the shift correcting amount is not shared between the steering roller 202 and the pre-secondary transfer roller 204 (the difference in the tension T1 in FIG. 8). In this manner, it becomes possible to suppress the waving of the intermediary transfer belt 106 and to adjust so that an amount of the waving which occurs at this time does not exceed a detectable area of the sensor unit 119, and then the waving does not affect the detecting surface.

Incidentally, in a case in which the tilting direction of the steering roller 202 is the opposite to the case in FIG. 18, the pre-secondary transfer roller 204 should be inclined in the opposite direction to the case in FIG. 18 so that the tilting direction of the steering roller 202 and the inclination direction of the pre-secondary transfer roller 204 are in the same direction. In other words, in this case, the phase of the adjusting ring 301 should be adjusted so that the first adjusting surface 302*a* or the second adjusting surface 302*b* is in contact with the positioning surface 306 in order to lower the end portion of the rear side (upper side in FIG. 18) of the pre-secondary transfer roller 204.

6-3. Adjusting Operation

In the present Embodiment, condition of an occurrence of the waving of the intermediary transfer belt 106 is inspected before shipping of the image forming apparatus 100 or the intermediary transfer unit 200 from a factory, and the phase of the adjusting ring 301 of the adjusting mechanism 300 is adjusted according to results of the inspection. For example, the intermediary transfer belt 106 is driven and rotated using a specified jig which can reproduce, with sufficient accuracy, a driving state of the intermediary transfer unit 200 in a state in which the intermediary transfer unit 200 is attached to the image forming apparatus 100. At this time, the intermediary transfer unit 200 is, for example, in the all contacting state. Then, for example, condition of the waving of the intermediary transfer belt 106 at the same detecting position as the sensor unit 119 in the image forming apparatus 100 is measured by a measurement device provided with an optical sensor similar to the sensor unit 119 in the image forming apparatus 100. In this case, for example, it is preferable to measure the condition of the waving of the intermediary transfer belt 106 at least on the front side and on the rear side of the intermediary transfer belt 106 more than the center portion of the intermediary transfer belt 106 in the widthwise direction, similar to each of the detecting positions of the front side sensor portion 119*a* and the rear side sensor portion 119*c* of the sensor unit 119. Furthermore, the condition of the waving of the intermediary transfer belt 106 at the center portion of the intermediary transfer belt 106 in the widthwise direction, similar to the detecting position of the central sensor portion 119*b* of the sensor unit 119, may be measured.

The condition of the waving of the intermediary transfer belt 106 may be determined by presence or absence, or changes in an amount of reflected light from the intermediary transfer belt 106 as measured by the above measurement device. For example, it is possible to determine whether or not the waving of the intermediary transfer belt 106 is occurring, whether the waving is occurring on the front side or the rear side of the intermediary transfer belt 106 in the widthwise direction, and degree (large or small) of the occurring waving. For example, first, the waving of the intermediary transfer belt 106 is measured with the phase of the adjusting ring 301 of the adjusting mechanism 300 set as a phase in which the third adjusting surface 302*c* is in contact with the positioning surface 306 (in the state in which the pre-secondary transfer roller 204 is not inclined relative to the driving roller 201). In a case in which there is no occurrence of the waving of the intermediary transfer belt 106 (including cases in which the waving is occurring slightly in degree where the suppression of the waving using the adjusting mechanism 300 is not necessary), it is not necessary to adjust the phase of the adjusting ring 301 of the adjusting mechanism 300. On the other hand, in a case in which the waving of the intermediary transfer belt 106 is occurring, it is determined whether the waving is occurring on the front side or the rear side of the intermediary transfer belt 106 in the widthwise direction (or whether larger waving is occurring on the front side or the rear side), and the degree (large or small) of the occurring waving. This determination may be made by the operator based on the measurement results from the measurement device, or a control device may automatically make this determination based on threshold values set in advance and the measurement results from the measurement device and notify the operator of the results of the determination. The operator then adjusts the phase of the adjusting ring 301 of the adjusting mechanism 300 so that the pre-secondary transfer roller 204 is inclined relative to the driving roller 201 in a direction and magnitude which suppress the occurring waving. In other words, the adjusting ring 301 is once removed from the pre-secondary transfer roller bearing member 218, and then the phase is changed and attached to the pre-secondary transfer roller bearing member 218 again. After that, the status of waving of the intermediary transfer belt 106 may be measured again to confirm that the waving is suppressed.

An amount of the waving of the intermediary transfer belt 106 depends on the difference in the tension T1 in the widthwise direction of the intermediary transfer belt 106, and is correlated to a balanced position of the intermediary transfer belt 106 during conveyance by the belt 106 (a tilt amount of the steering roller 202 at that time). Therefore, the larger the tilt amount of the steering roller 202, the larger the waving tends to be. Therefore, in a case in which the tilt amount of the steering roller 202 is a first tilt amount, an inclination amount in the rotational axis direction of the pre-secondary transfer roller 204 is a first inclination amount. In addition, in a case in which the tilt amount of the steering roller 202 is a second tilt amount larger than the first tilt amount, the inclination amount in the rotational axis direction of the pre-secondary transfer roller 204 is a second inclination amount larger than the first inclination amount.

7. Effects on Color Misalignment in a Main Scan Direction, Etc.

Next, effects due to the adjusting mechanism 300 in the present Embodiment on geometric characteristics such as the color misalignment in a main scan direction and squareness of a leading end will be described.

In a case in which the waving of the intermediary transfer belt 106 is suppressed by the adjusting mechanism 300, a running characteristic of the intermediary transfer belt 106, which is obliqued due to the difference in the tension in the widthwise direction of the intermediary transfer belt 106, also changes, and the shift of the intermediary transfer belt 106 becomes smaller. As a result, the geometric characteristics such as the color misalignment in the main scan direction and the squareness of the leading end are improved. The improvement of the color misalignment in the main scan direction and the squareness of the leading end will be described in more detail with reference to FIG. 19.

Figure 19:
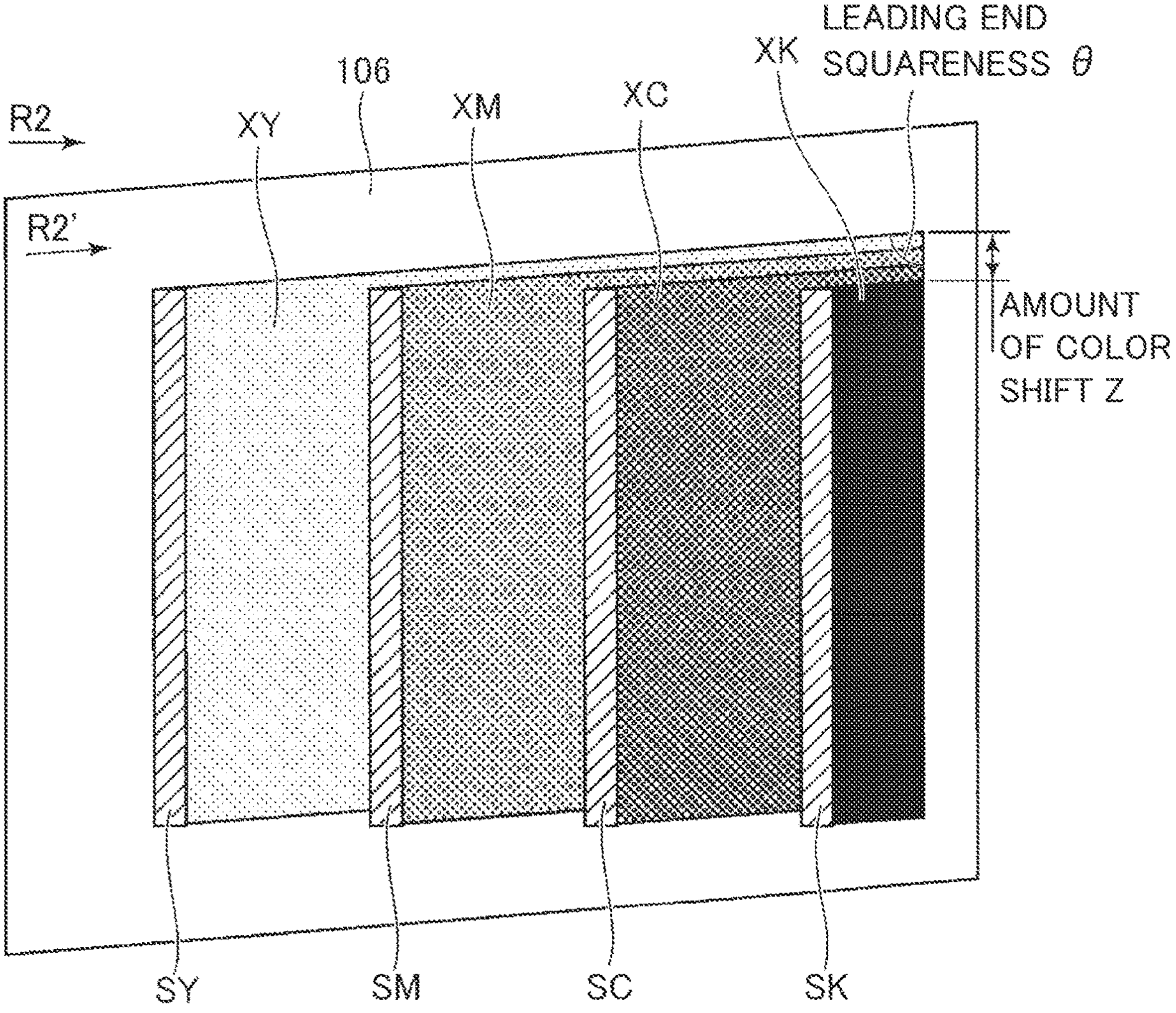
FIG. 19 is a schematic view to illustrate color misalignment in a main scan direction and squareness of a leading end.

The color misalignment is a phenomenon in which, when the toner image, which is formed by the image forming portion upstream with respect to the conveyance direction of the intermediary transfer belt 106 (direction of an arrow R2 in FIG. 19), such as the image forming portion SY, and is primarily transferred to the intermediary transfer belt 106, and the toner images, which are formed by the image forming portions SM, SC and SK, which are positioned downstream thereof and are primarily transferred to the intermediary transfer belt 106, are superimposed, misalignment occurs among those toner images. In particular, the color misalignment in the widthwise direction of the intermediary transfer belt 106 is called the "color misalignment in the main scan direction". There are multiple causes for the occurrence of the color misalignment in the main scan direction, and the shift of the intermediary transfer belt 106 during running is one of the causes. For example, as shown in FIG. 19, a case in which the intermediary transfer belt 106 shifts toward the rear side (upper side in FIG. 19) in the primary transfer surface H1 (direction of an arrow R2') is considered. In this case, the toner image XY formed by the image forming portion SY and transferred to the intermediary transfer belt 106 is conveyed to the downstream of the conveyance direction of the intermediary transfer belt 106 with shifting to the rear side. And the toner image XY may not overlap with, for example, the toner image XK, which is formed by the image forming portion SK of the downstream side and is primarily transferred to the intermediary transfer belt 106. This is a color misalignment amount Z caused by the shift of the intermediary transfer belt 106. In a case in which the color misalignment amount Z is constant, it is possible to suppress the color misalignment by transferring the toner image, which is formed by the image forming portion of the downstream side, with shifting by the amount of the shift of the intermediary transfer belt 106.

However, in a color misalignment which occurs, for example, immediately after changing the stretching mode of the intermediary transfer belt 106 from the black contacting state to the all contacting state, there may be a case in which the color misalignment amount Z is not constant. For example, those cases may include a case in which the monochrome/color mixed image data is sent to the image forming apparatus 100, a case in which the black contacting state is used in the standby mode of the image forming apparatus 100 and a printing is performed after changing to the all contacting state, etc. This is because balance of the tension in the widthwise direction of the intermediary transfer belt 106 changes between the all contacting state and the black contacting state, and the tilt amount of the steering roller 202 changes between the black contacting state and the all contacting state. In other words, because the stretching mode of the intermediary transfer belt 106 changes and the balance of the tension in the widthwise direction of the intermediary transfer belt 106 also changes, a shifting state of the intermediary transfer belt 106 is not stable immediately after switching the stretching mode of the intermediary transfer belt 106. Therefore, after switching the stretching mode of the intermediary transfer belt 106, a shifting amount continues to change until the intermediary transfer belt 106 is poised in a stable position of a steering, which may cause the color misalignment to occur.

In contrast, by balancing the tension in the widthwise direction of the intermediary transfer belt 106 with the adjusting mechanism 300, the tilt amount of the steering roller 202 tends to become smaller in both the black contacting state and the all contacting state. Therefore, the color misalignment amount Z also tends to become smaller since the shift of the intermediary transfer belt 106 in the widthwise direction due to the difference in the tension of the intermediary transfer belt 106 becomes smaller.

Next, the squareness of the leading end will be described. In the case in which the shift occurs as shown in FIG. 19, a rectangular image becomes a parallelogram because the image moves obliquely. An angle of the parallelogram at the leading end of the image is called the squareness of the leading end. As described above, in the case in which the shift of the intermediary transfer belt 106 becomes smaller by adjusting the balance of the tension in the widthwise direction of the intermediary transfer belt 106 with the adjusting mechanism 300, an inclination of the parallelogram becomes smaller and the squareness of the leading end is improved.

8. Actions and Effects

Thus, in the present Embodiment, the belt conveyance device (intermediary transfer unit) 200 includes the plurality of the stretching rollers, the endless belt (intermediary transfer belt) 106, which is stretched around and conveyed by the plurality of stretching rollers, and the plurality of the stretching rollers includes a first stretching roller (driving roller) 201, a second stretching roller (steering roller) 202, which is positioned downstream of the first stretching roller 201 in the conveyance direction of the belt 106, and a third stretching roller (pre-secondary transfer roller) 204, which is positioned downstream of the second stretching roller 202 and upstream of the first stretching roller 201 in the conveyance direction. In addition, in the present Embodiment, the belt conveyance device 200 includes the steering mechanism 230, which is capable of tilting the second stretching roller 202 so as to incline the rotational axis direction of the second stretching roller 202 relative to the rotational axis direction of the first stretching roller 201 during conveyance by the belt 106, includes a tiltable supporting member (swinging plate) 212 which supports the second stretching roller 202, and, by action generated between the belt 106 and the second stretching roller 202 due to a change of the position of the belt 106 in the widthwise direction, is configured to tilt the second stretching roller 202 in the direction where the change of the position of the belt 106 in the widthwise direction is cancelled, and the adjusting mechanism 300 capable of adjusting so as to incline the rotational axis direction of the third stretching roller 204 relative to the rotational axis direction of the first stretching roller 201. And the adjusting mechanism 300 is adjusted to incline the third stretching roller 204 so as to reduce the waving of the belt 106, which occurs due to the tilt of the second stretching roller 202 during conveyance by the belt 106.

Here, presence or absence of the waving can be determined by a fact that a detection result of the sensor unit 119 is normal. The sensor unit 119 detects the toner image formed on the surface of the belt (intermediary transfer belt) 106. The sensor unit 119 irradiates the surface of the belt 106 or the toner image thereon with light and receives the reflected light from the surface of the belt 106 or the toner image thereon. And the sensor unit 119 is capable of distinguishing the light reflected from the toner image, which has a lower reflected light amount than the reflected light from the surface of the belt 106. In order to compare the reflected light amount from the belt 106 with that from the toner image, it is necessary that the reflected light amount from the belt 106 is stabilized. Therefore, light amount adjustment of the sensor unit 119 is performed. The light amount adjustment is what adjusts an amount of light emitted toward the belt 106 so that the reflected light amount from the belt 106 is a desired value. However, here, in a case in which the waving is occurring on the belt 106, a direction of the light reflected from the belt 106 is not stabilized, and the light does not hit the light receiving portion (light receiving element) of the sensor unit 119 as it should do. Then, a state in which a receiving light amount is low even when the amount of light of a light emitting portion (light emitting element) of the sensor unit 119 is maximized, or a state in which variation in the receiving light amount over a certain period of time is large may arise. Thus, it is possible to confirm that the waving is not occurring by monitoring the receiving light amount of the light receiving portion of the sensor unit 119 and checking whether the set sensor light amount and the receiving light amount are within a normal range. The normal range of the receiving light amount depends on a configuration of the sensor portion (119*a*, 119*b* or 119*c*) of the sensor unit 119 used, but in the present Embodiment, that is set as difference between maximum output voltage and minimum output voltage (P-P) of the light receiving portion is equal to or less than 0.2 V In other words, in a case in which the output voltage of the light receiving portion of the sensor unit 119 in a state in which the adjustment by the adjusting mechanism 300 is performed is equal to or less than 0.2 V, then the output voltage of the light receiving portion of the sensor unit 119 becomes more than 0.2 V when the third tension roller (pre-secondary transfer roller) 204 is moved to a state in which the adjustment by the adjusting mechanism 300 is not performed. The output voltage of the light receiving portion is, specifically, acquired by measuring the receiving light amount of the reflected light from the surface (substrate) of the belt 106 with a constant amount of the light being emitted using the sensor unit 119 while the belt 106 is driven for one lap. For example, the sensor unit 119 performs a detecting operation in a correcting operation (correcting sequence) such as the color misalignment correction or the density correction. Therefore, the detecting operation by the sensor unit 119 is performed using a user mode, etc., in which the correcting operation may be performed arbitrarily. It is then possible to acquire data on the output voltage of the light receiving portion by measuring an output of a sensor portion on the substance of the belt 106 at that time. Upon this, it is necessary to perform the measurement after the shift of the belt 106 is stabilized. Therefore, after moving the adjusting mechanism 300, the belt 106 should be operated for equal to or more than one minute in the same stretching mode of the belt 106 as before the adjusting mechanism 300 is moved (e.g., in a separated state of the primary transfer roller during the correcting operation). By this, it becomes in a steady state (stable state) in which an action between the belt 106 and the steering mechanism 230 (friction force between the belt 106 and the rubbing portions 216 in both end portions in the widthwise direction of the belt 106) is balanced during conveyance by the belt 106. Incidentally, the tilting direction of the steering mechanism 230 during conveyance by the belt 106 described above shall be determined in the steady state (stable state).

For example, according to the first adjusting method, during conveyance by the belt 106, in a case in which it is configured that a position of the belt 106 in the widthwise direction is changed in a direction heading from a first end portion side (e.g., rear side) to a second end portion side (e.g., front side) and the second stretching roller 202 is tilted in a first tilting direction (e.g., the direction of the arrow Q in FIG. 5), the adjusting mechanism 300 is adjusted so that the inclination direction of the rotational axis direction of the third stretching roller 204 relative to the rotational axis direction of the first stretching roller 201 during conveyance by the belt 106 is an inclination direction in which the belt 106 is stretched outward more in an end portion of the first end portion side (e.g., rear side) than in an end portion of the second end portion side (e.g., front side) of the third stretching roller 204 in the rotational axis direction. In a case in which the shifting direction of the belt 106 (tilting direction of the second stretching roller 202) during conveyance by the belt 106 is opposite to the above, the adjusting mechanism 300 is adjusted so that the inclination direction of the third stretching roller 204 is opposite to the above.

In addition, for example, according to the second adjusting method, during conveyance by the belt 106, in a case in which it is configured that the position of the belt 106 in the widthwise direction is changed in the direction heading from the first end portion side (e.g., rear side) to the second end portion side (e.g., front side) and the second stretching roller 202 is tilted in the first tilting direction (e.g., direction of the arrow Q in FIG. 5), the adjusting mechanism 300 is adjusted so that the inclination direction of the rotational axis direction of the third stretching roller 204 relative to the rotational axis direction of the first stretching roller 201 during conveyance by the belt 106 is the same direction as the tilting direction of the second stretching roller 202. In other words, in this case, the adjusting mechanism 300 is adjusted so that the inclination direction of the rotational axis direction of the third stretching roller 204 relative to the rotational axis direction of the first stretching roller 201 during conveyance by the belt 106 is an inclination direction in which the belt 106 is stretched outward more in the end portion of the second end portion side (e.g., front side) than in the end portion of the first end portion side (e.g., rear side) of the third stretching roller 204 in the rotational axis direction. In a case in which the shifting direction of the belt 106 (tilting direction of the second stretching roller 202) during conveyance by the belt 106 is opposite to the above, the adjusting mechanism 300 is adjusted so that the inclination direction of the third stretching roller 204 is opposite to the above.

In the present Embodiment, the adjusting mechanism 300 is constituted to adjust the inclination amount in the rotational axis direction of the third stretching roller 204 relative to the rotational axis direction of the first stretching roller 201 in multiple stages, and in the case in which the tilt amount of the second stretching roller 202, during conveyance by the belt 106, is the first tilt amount, the inclination amount in the rotational axis direction of the third stretching roller 204 is the first inclination amount, and in the case in which the tilt amount of the second stretching roller 202, during conveyance by the belt 106, is the second tilt amount larger than the first tilt amount, the inclination amount in the rotational axis direction of the third stretching roller 204 is the second inclination amount larger than the first inclination amount. In addition, in the present Embodiment, the adjusting mechanism 300 includes the adjusting member (adjusting ring) 301 attached to the movable bearing member (pre-secondary transfer roller bearing member) 218 rotatably supporting the third stretching roller 204 and the abutting portion (positioning surface) 306 contacted by the adjusting member 301, and the adjusting member 301 is constituted to adjust the distance in the radial direction of the third stretching roller 204 from the rotational axis direction of the third stretching roller 204 to the contacting portion (adjusting surface) 302 where the adjusting member contacts the abutting portion 306. In particular, in the present Embodiment, the adjusting member 301 includes the plurality of contacting portions (adjusting surfaces) 302*a* through 302*e* contactable to the abutting portion 306, distances in the radial direction of the third stretching roller 204 from the plurality of contacting portions to the rotational axis of the third stretching roller 204 being different, and any one of the plurality of contacting portions is adjusted so as to contact the abutting portion 306 by the position of the adjusting member 301 with respect to the rotational direction about the rotational axis of the third stretching roller 204 being changed and then by the adjusting member 301 being attached to the bearing member 218. That is, the inclination amount of the third stretching roller 204 is configured to be adjustable in multiple stages. In the present Embodiment, the plurality of contacting portions 302*a* through 302*e* include a first contacting portion (e.g., the first adjusting surface 302*a*) of which the inclination direction of the rotational axis direction of the third stretching roller 204 relative to the rotational axis direction of the first stretching roller 201 is a first inclination direction in a state of contacting the abutting portion 306, a second contacting portion (e.g., the third adjusting surface 302*c*) of which the rotational axis direction of the third stretching roller 204 relative to the rotational axis direction of the first stretching roller 201 is substantially in parallel in the state of contacting the abutting portion 306, and the third contacting portion (e.g., the fifth adjusting surface 302*e*) of which the inclination direction of the rotational axis direction of the third stretching roller 204 relative to the rotational axis direction of the first stretching roller 201 is a second inclination direction opposite to the first inclination direction in the state of contacting the abutting portion. In addition, in the present Embodiment, the plurality of contacting portions 302*a* through 302*e* are radially arranged about the rotational axis of the third stretching roller 204 as a center.

In addition, in the present Embodiment, the belt conveyance device 200 includes the movable moving member 221 configured to move the bearing member 218 so as to move the third stretching roller 204 to the first position during conveyance by the belt 106 and the second position retracted inside of the first position, and the abutting portion 306 is provided on the moving member 221 and the abutting portion 306 is contacted by the adjusting member 301 when the third stretching roller 204 is positioned in the first position by the moving member 221. In addition, in the present Embodiment, the adjusting mechanism 300 is provided on either one end side of the belt 106 with respect to the widthwise direction. In addition, in the present Embodiment, of the plurality of stretching rollers, the rotational axis directions of the stretching rollers other than the second stretching roller 202 and the third stretching roller 204 are substantially parallel to each other. In addition, in the present Embodiment, the second stretching roller 202 applies the tension to the belt 106 by urging the belt 106 from the inner circumferential surface side to the outer circumferential surface side. In addition, in the present Embodiment, the third stretching roller 204 has the crown shape of which the outer diameters of both end portions are smaller than the outer diameter of the center portion with respect to the rotational axial direction. In addition, in the present Embodiment, the steering mechanism 230 is provided with the rubbing portions (sliding ring portions) 216 provided on both end portions of the second stretching roller 201 with respect to the rotational axis direction, respectively, and capable of rubbing the inner circumferential surface of the belt 106, and tilts the second stretching roller 201 depending on the difference in the frictional force between the rubbing portions 216 and the inner circumferential surface of the belt 106 with respect to both end portions in the rotational axis direction of the second stretching roller 201. In addition, in the present Embodiment, the belt 106 is the intermediary transfer belt, which carries and conveys the toner image formed by the toner image forming means S, to transfer the toner image onto the recording material P, and the plurality of stretching rollers include the fourth stretching roller (pre-primary transfer roller) 203 positioned downstream of the second stretching roller 202 and upstream of the third stretching roller 204 in the conveyance direction, and the toner image is formed on the surface of the belt 106 from the fourth stretching roller 203 to the third stretching roller 204 in the conveyance direction by the toner image forming means S and the toner image is transferred onto the recording material P from the belt 106 of which a part is wound on the first stretching roller 201. In addition, in the present Embodiment, the image forming apparatus 100 includes the belt conveyance device 200 of the configuration described above, and the toner image forming means S.

And, as described above, according to the present Embodiment, it becomes possible to suppress the waving of the intermediary transfer belt 106 caused by the difference in the tension in the widthwise direction of the transfer belt 106 which occurs due to the tilt of the steering roller 202.

In addition, according to the present Embodiment, by suppressing the waving of the intermediary transfer belt 106 with the adjusting mechanism 300, the balance of the tension in the widthwise direction of the intermediary transfer belt 106 is adjusted, and the geometric characteristics such as the color misalignment in the main scan direction and the squareness of the leading end are improved.

Embodiment 2

Next, another Embodiment of the present invention will be described. A basic configuration and an operation of the image forming apparatus of the present Embodiment are the same as those of the image forming apparatus of the Embodiment 1. Therefore, elements of the image forming apparatus in the present Embodiment that are provided with functions or configurations which are the same as or corresponding to those of the image forming apparatus in the Embodiment 1 are marked with the same reference numerals as in the Embodiment 1, and detailed explanations thereof will be omitted.

In the present Embodiment, several modified examples of the adjusting mechanism 300 in the Embodiment 1 will be described.

In the Embodiment 1, the adjusting ring 301 of the adjusting mechanism 300 includes the adjusting surfaces 302 of the five protruding shapes as the contacting portions. However, the present invention is not limited to such a configuration, but the number of the adjusting surfaces 302 of the plurality of the protruding shape may be less or more than five. The number may be set appropriately according to a tendency of occurrence and degree of the waving of the intermediary transfer belt 106 due to the configuration of the intermediary transfer unit 200, etc. In addition, for example, as shown in part (a) of FIG. 20, the adjusting surface 302 of the adjusting ring 301 may be formed so that the height with respect to the radial direction of the pre-secondary transfer roller 204 changes continuously. In this case, it is possible to fix the adjusting ring 301 at any phase so that any position of the adjusting surface 302 is in contact with the positioning surface 306. Alternatively, also in this case, as the adjusting ring 301 in the Embodiment 1, it may be configured that a position of the adjusting surface 302 which is in contact with the positioning surface 306 is selected from a plurality of positions. For example, the positioning protrusion provided in the adjusting ring 301 may be configured to engage with either one of a plurality of positioning grooves provided in the pre-secondary transfer roller bearing member 218.

In addition, in the Embodiment 1, the adjusting mechanism 300 is configured to include the adjusting ring 301 which is to be attached to the pre-secondary transfer roller bearing member 218 coaxially with the pre-secondary transfer roller 204. The adjusting ring 301 is what determines the position of the pre-secondary transfer roller bearing member 218 (end portion of the pre-secondary transfer roller 204) according to the height of the adjusting surface 302*a*, 302*b*, 302*c*, 302*d* or 302*e*, which abuts a member on the frame 240 side (acting portion 222 of the slider 221 in the Embodiment 1). Such a configuration has an advantage that it is easy to perform the adjustment of the alignment of the pre-secondary transfer roller 204 relative to the driving roller 201, etc., as described in the Embodiment 1. However, the present invention is not limited to employing the adjusting mechanism 300 of such a configuration. It is sufficient as long as the alignment of the pre-secondary transfer roller (third stretching roller) 204 relative to the driving roller (first stretching roller) 201 can be adjusted so as to suppress the waving of the intermediary transfer belt 106 due to the tilt of the steering roller (second stretching roller) 202, which is tiltable relative to the driving roller (first stretching roller) 201.

Figure 20:
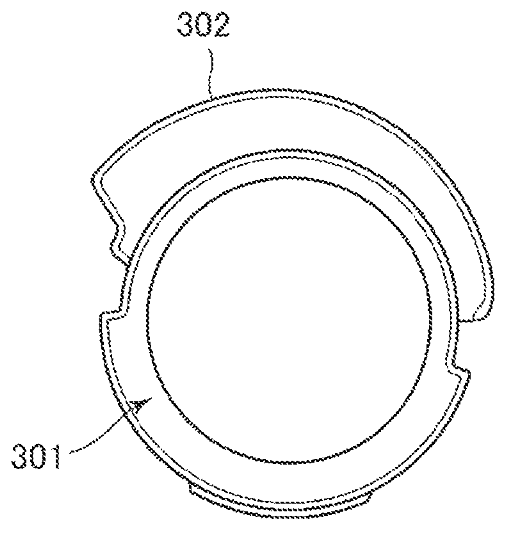
FIG. 20, part (a) and part (b), is a side view illustrating another example of the adjusting ring and a schematic side view illustrating another example of the adjusting mechanism.
Figure 20:
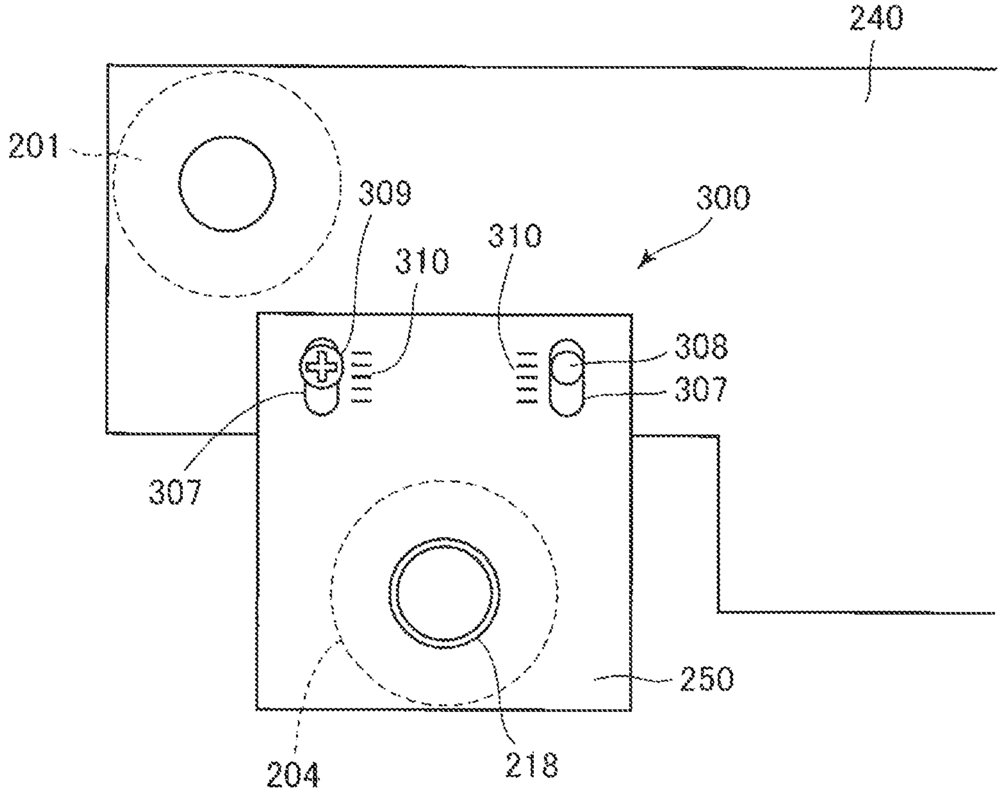

For example, it may be configured that the position of the pre-secondary transfer roller bearing member 218 (end portion of the pre-secondary transfer roller 204) is determined by a configuration as shown in part (b) of FIG. 20. Part (b) of FIG. 20 is a schematic side view illustrating another example of a supporting configuration on the rear side of the pre-secondary transfer roller 204. In the configuration of part (b) of FIG. 20, the adjusting mechanism 300 is constituted by a long hole 307 as an adjusting portion provided in a bearing frame 250, which holds the secondary transfer roller bearing member 218, a fixing hole 308 provided in the frame 240, a screw 309 as a fixing member, etc. In the configuration of part (b) of FIG. 20, instead of the adjustment of the phase of the adjusting ring 301 in the Embodiment 1, a position of the bearing frame 250 relative to the frame 240 can be adjusted in the vertical direction along the long hole 307. In addition, for example, a scale 310 may be provided on the bearing frame 250, which indicates whether the pre-secondary transfer roller 204 is parallel relative to the driving roller 201 or inclined so as to lower or raise the rear side. The bearing frame 250 is then positioned in a desired position and the screws 309 are fixed to the fixing holes 308 through the long holes 307 (only the screw 309 which is fixed to one of the two fixing holes 308 is shown). By this, it becomes possible to determine the position of the pre-secondary transfer roller bearing member 218 (end portion of the pre-secondary transfer roller 204) by fixing the bearing frame 250 to the frame 240.

As described above, the configuration as in the present Embodiment may also be able to suppress the waving of the intermediary transfer belt 106 caused by the difference in the tension in the widthwise direction of the intermediary transfer belt 106 due to the tilt of the steering roller 202, as in the Embodiment 1. In addition, as in the Embodiment 1, according to the configuration as in the present Embodiment, the geometric characteristics such as the color misalignment in the main scan direction and the squareness of the leading end are improved.

OTHER EMBODIMENTS

The present invention has been described according to the specific Embodiments, however, the present invention is not limited to the above Embodiments.

In the Embodiments described above, the number of image forming portions is four, however, it is not limited to this number, but may be more or less. In addition, an order of the image forming portions for each color also is not limited to those in the Embodiments described above.

In addition, in the Embodiments described above, the intermediary transfer belt is stretched by the four stretching rollers, however, the number of the stretching rollers for stretching the intermediary transfer belt is not limited to this, but may be more or less.

In addition, in the Embodiments described above, the intermediary transfer belt is stretched by the four stretching rollers, however, an arranging order of respective rollers is arbitrary. In addition, in the present Embodiment, the waving was suppressed by adjusting the inclination direction of the pre-secondary transfer roller 204, however, an inclination direction of a roller other than the pre-secondary transfer roller 204 may be adjusted. However, in order to suppress the waving of the secondary transfer surface and the waving of the primary transfer surface, the roller of which the inclination direction is adjusted is preferably the pre-secondary transfer roller 204.

In addition, in the Embodiments described above, the tilting direction of the steering roller is the direction which lifts up (or pushes down) the surface of the intermediary transfer belt formed by the driving roller and the steering roller (direction substantially perpendicular to the surface), however, it is not limited to this configuration. The tilting direction of the steering roller may be the substantially perpendicular direction, a substantially parallel direction, or any direction in between these directions with respect to the surface of the intermediary transfer belt formed by the driving roller and the steering roller.

In addition, in the Embodiments described above, the stretching roller which forms the secondary transfer portion (secondary transfer inner roller) has the function of the driving roller, however, it is not limited to this configuration, but any of the plurality of the stretching rollers may have the function of the driving roller.

In addition, in the Embodiments described above, the adjusting mechanism is provided on either one end side of the intermediary transfer belt in the widthwise direction, however, it may be provided on both end sides. In this case, for example, both adjusting mechanisms may be similarly configured (substantially symmetrical with respect to the center of the intermediary transfer belt in the widthwise direction). The alignment of the pre-secondary transfer roller may then be adjusted using either one of or both adjusting mechanisms, depending on the degree of the waving of the intermediary transfer belt, etc. It is also possible to increase the inclination amount of the pre-secondary transfer roller by moving the two ends of the pre-secondary transfer roller in opposite directions of each other using both adjusting mechanisms.

In addition, the belt of the belt conveyance device is not limited to the intermediary transfer belt. The belt is, typically, used as a conveyance member which carries and conveys the toner image or carries and conveys the recording material onto which the toner image is transferred. The conveyance member, which carries and conveys the toner image, includes an electrophotographic photosensitive member of a belt shape (photosensitive member belt), an intermediary transfer member (intermediary transfer belt), which carries and conveys the toner image transferred from the photosensitive member, to transfer the toner image onto the recording material, etc. In addition, the conveyance member, which carries and conveys the recording material onto which the toner image is transferred, includes a recording material carrying member (conveyance belt) which carries and conveys the recording material onto which the toner image is transferred from the photosensitive member, etc.

According to the present invention, it becomes possible to suppress the waving of the belt caused by the difference in the tension of the belt in the widthwise direction which occurs due to the tilt of the steering roller.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-012380 filed on Jan. 30, 2023, and No. 2023-186034 filed on Oct. 30, 2023, which are hereby incorporated by reference herein in their entirety.

What is claimed is:

1. A belt conveyance device comprising:

a rotatable endless belt onto which a toner image is transferred;

a first stretching roller configured to stretch the belt;

a second stretching roller configured to stretch the belt;

a steering roller tiltably supported with respect to a rotational axis direction of the first stretching roller and configured to stretch the belt, a steering mechanism configured to, by force generated between the belt and the steering roller due to a change in a position of the belt in a widthwise direction during a transfer operation in which the belt is rotationally driven and a toner image is transferred onto the belt, tilt the steering roller in a direction such that the change in the position of the belt in the widthwise direction is cancelled; and an adjusting mechanism configured to, when the transfer operation is not performed, adjust an inclination angle of a rotational axis direction of the second stretching roller relative to the rotational axis direction of the first stretching roller, wherein during the transfer operation the adjusting mechanism is capable of maintaining the adjusted inclination angle.

2. A belt conveyance device according to claim 1, wherein the adjusting mechanism is configured to adjust an inclination amount of the rotational axis direction of the second stretching roller relative to the rotational axis direction of the first stretching roller in multiple stages, and wherein in a case in which a tilt amount of the steering roller is a first tilt amount when the belt is rotated before shipping the belt conveyance device, the inclination amount of the rotational axis direction of the second stretching roller which is set during the transferring operation is a first inclination amount, and in a case in which the tilt amount of the steering roller is a second tilt amount larger than the first tilt amount when the belt is rotated before shipping the belt conveyance device, the inclination amount of the rotational axis direction of the second stretching roller is a second inclination amount larger than the first inclination amount.

3. A belt conveyance device according to claim 1, wherein the adjusting mechanism includes an adjusting member attached to a movable bearing member rotatably supporting the second stretching roller and an abutting portion contacted by the adjusting member, and wherein the adjusting member is configured to adjust a distance in a radial direction of the second stretching roller from a rotational axis of the second stretching roller to a contacting portion where the adjusting member contacts the abutting portion.

4. A belt conveyance device according to claim 1, wherein the adjusting mechanism includes an adjusting member attached to a movable bearing member rotatably supporting the second stretching roller and an abutting portion contacted by the adjusting member, wherein the adjusting member includes a plurality of contacting portions contactable to the abutting portion, distances in a radial direction of the second stretching roller from the plurality of contacting portions to a rotational axis of the second stretching roller being different, and wherein any one of the plurality of contacting portions is adjusted so as to contact the abutting portion by a position of the adjusting member with respect to a rotational direction about the rotational axis of the second stretching roller being changed and then by the adjusting member being attached to the bearing member.

5. A belt conveyance device according to claim 4, wherein the plurality of contacting portions include:

a first contacting portion of which an inclination direction of a rotational axis direction of the second stretching roller relative to the rotational axis direction of the first stretching roller is a first inclination direction in a state of contacting the abutting portion, a second contacting portion of which the rotational axis direction of the second stretching roller relative to the rotational axis direction of the first stretching roller is substantially parallel in the state of contacting the abutting portion, and a third contacting portion of which the inclination direction of the rotational axis direction of the second stretching roller relative to the rotational axis direction of the first stretching roller is a second inclination direction opposite to the first inclination direction in the state of contacting the abutting portion.

6. A belt conveyance device according to claim 4, wherein the plurality of contacting portions are radially arranged about the rotational axis of the second stretching roller as a center.

7. A belt conveyance device according to claim 4, further comprising a movable moving member configured to move the bearing member so as to move the second stretching roller to a first position during conveyance by the belt and a second position retracted inside of the first position, and wherein the abutting portion is provided on the moving member and the abutting portion is contacted by the adjusting member when the second stretching roller is positioned in the first position by the moving member.

8. A belt conveyance device according to claim 1, wherein the adjusting mechanism is provided on either end side of the belt with respect to the widthwise direction.

9. A belt conveyance device according to claim 1, wherein of a plurality of stretching rollers, the rotational axis directions of the stretching rollers other than the second stretching roller are substantially parallel to each other.

10. A belt conveyance device according to claim 1, wherein the steering roller applies tension to the belt by urging the belt from an inner circumferential surface side to an outer circumferential surface side.

11. A belt conveyance device according to claim 1, wherein the second stretching roller has a crown shape of which outer diameters of both end portions are smaller than an outer diameter of a center portion with respect to the rotational axis direction.

12. A belt conveyance device according to claim 1, wherein the steering mechanism is provided with rubbing portions provided on both end portions of the steering roller with respect to the rotational axis direction, respectively, and capable of rubbing an inner circumferential surface of the belt, and tilts the steering roller depending on a difference in frictional force between the rubbing portions and the inner circumferential surface of the belt with respect to both end portions in the rotational axis direction of the steering roller.

13. A belt conveyance device according to claim 1, wherein the first stretching roller forms a transfer portion where the toner image transferred onto the belt is subsequently transferred onto a recording material.

14. A belt conveyance device according to claim 1, wherein the second stretching roller is disposed adjacently upstream of the first stretching roller with respect to a conveyance direction of the belt.

15. A belt conveyance device comprising:

a rotatable endless belt onto which a toner image is transferred;

a first stretching roller configured to stretch the belt;

a second stretching roller configured to stretch the belt;

a steering roller tiltably supported with respect to a rotational axis direction of the first stretching roller and configured to steer the belt, a steering mechanism configured to, by force generated between the belt and the steering roller due to a change in a position of the belt in a widthwise direction during a transfer operation in which the belt is rotationally driven and a toner image is transferred onto the belt, tilt the steering roller in a direction such that the change in the position of the belt in the widthwise direction is cancelled; and an adjusting mechanism configured to, when the transfer operation is not performed, adjust an inclination angle of a rotational axis direction of the second stretching roller relative to the rotational axis direction of the first stretching roller, wherein the adjusting mechanism includes an adjusting member attached to a movable bearing member rotatably supporting the second stretching roller and an abutting portion contacted by the adjusting member, wherein the adjusting member includes a plurality of contacting portions contactable to the abutting portion, distances in a radial direction of the second stretching roller from the plurality of contacting portions to a rotational axis of the second stretching roller being different, and wherein any one of the plurality of contacting portions is adjusted so as to contact the abutting portion by a position of the adjusting member with respect to a rotational direction about the rotational axis of the second stretching roller being changed and then by the adjusting member being attached to the bearing member.

16. A belt conveyance device according to claim 15, wherein the plurality of contacting portions include:

a first contacting portion of which an inclination direction in a rotational axis direction of the second stretching roller relative to the rotational axis direction of the first stretching roller is a first inclination direction in a state of contacting the abutting portion, a second contacting portion of which the rotational axis direction of the second stretching roller relative to the rotational axis direction of the first stretching roller is substantially parallel in the state of contacting the abutting portion, and a third contacting portion of which the inclination direction of the rotational axis direction of the second stretching roller relative to the rotational axis direction of the first stretching roller is a second inclination direction opposite to the first inclination direction in the state of contacting the abutting portion.

17. A belt conveyance device according to claim 15, wherein the plurality of contacting portions are radially arranged about the rotational axis of the second stretching roller as a center.

18. A belt conveyance device according to claim 15, further comprising a movable moving member configured to move the bearing member so as to move the second stretching roller to a first position during conveyance by the belt and a second position retracted inside of the first position, wherein the abutting portion is provided on the moving member and the abutting portion is contacted by the adjusting member when the second stretching roller is positioned in the first position by the moving member.

19. A belt conveyance device according to claim 15, wherein the adjusting mechanism is provided on either end side of the belt with respect to the widthwise direction.

20. A belt conveyance device according to claim 15, further comprising a third stretching roller disposed adjacently upstream of the first stretching roller with respect to a conveyance direction of the belt and positioned downstream of the steering roller and upstream of the second stretching roller with respect to the conveyance direction, wherein the toner image is formed on a surface of the belt from the third stretching roller to the second stretching roller in the conveyance direction by a toner image forming means and the toner image is transferred onto a recording material from the belt of which a part is wound on the first stretching roller.

21. An image forming apparatus comprising:

a belt conveyance device according to claim 1; and a toner image forming portion configured to form a toner image on the belt.

22. An image forming apparatus comprising:

a belt conveyance device according to claim 15; and a toner image forming portion configured to form a toner image on the belt.

23. A belt conveyance device according to claim 1, wherein during the transfer operation, an inclination direction of the rotational axis direction of the second stretching roller is the same as an inclination direction of the rotational axis direction of the steering roller.

24. A belt conveyance device according to claim 15, wherein during the transfer operation, an inclination direction of the rotational axis direction of the second stretching roller is the same as an inclination direction of the rotational axis direction of the steering roller.

* * * * *